US009772757B2

United States Patent
Nakao

(10) Patent No.: US 9,772,757 B2
(45) Date of Patent: Sep. 26, 2017

(54) ENLARGING IMAGE BASED ON PROXIMITY OF A POINTING OBJECT TO A DISPLAY SCREEN

(71) Applicant: PANASONIC INTELLECTUAL PROPERTY CORPORATION OF AMERICA, Torrance, CA (US)

(72) Inventor: Masatoshi Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 179 days.

(21) Appl. No.: 14/394,782

(22) PCT Filed: Mar. 15, 2013

(86) PCT No.: PCT/JP2013/001798
§ 371 (c)(1),
(2) Date: Oct. 16, 2014

(87) PCT Pub. No.: WO2013/161169
PCT Pub. Date: Oct. 31, 2013

(65) Prior Publication Data
US 2015/0052476 A1 Feb. 19, 2015

(30) Foreign Application Priority Data
Apr. 23, 2012 (JP) .................. 2012-098146

(51) Int. Cl.
*G06F 3/0488* (2013.01)
*G06F 3/0481* (2013.01)
(Continued)

(52) U.S. Cl.
CPC ....... *G06F 3/04845* (2013.01); *G01C 21/367* (2013.01); *G01C 21/3664* (2013.01);
(Continued)

(58) Field of Classification Search
CPC ............... G06F 3/04845; G06F 3/0488; G06F 3/04842; G06F 3/0481; G06F 3/048;
(Continued)

(56) References Cited

U.S. PATENT DOCUMENTS 9,229,573 B2 1/2016 Igarashi et al.
9,292,185 B2 3/2016 Sato et al.
(Continued)

FOREIGN PATENT DOCUMENTS

JP 2-153415 6/1990
JP 6-274586 9/1994
(Continued)

OTHER PUBLICATIONS

International Search Report and Written Opinion (ISR/WO) from PCT/JP2013/001798, dated Apr. 9, 2013, together with an English language translation of ISR.
(Continued)

*Primary Examiner* — Jeanette J Parker
(74) *Attorney, Agent, or Firm* — Greenblum & Bernstein, P.L.C.

(57) ABSTRACT

A display device includes a display section which displays an image in a screen, a proximity detecting section which detects proximity of a finger to the screen, an image generating section which generates, in accordance with the detected proximity of the finger, an enlarged image by enlarging the image displayed in the screen with a prescribed enlarged display magnification, and a display control section which controls to display a local enlarged image corresponding to a part of the generated enlarged image in a superimposed manner over the image in a position in the screen vertically below the finger whose proximity has been detected.

17 Claims, 12 Drawing Sheets

(51) Int. Cl.
  *G06F 3/0484* (2013.01)
  *G01C 21/36* (2006.01)
  *G06F 3/048* (2013.01)

(52) U.S. Cl.
  CPC .......... *G06F 3/0481* (2013.01); *G06F 3/0488* (2013.01); *G06F 3/04842* (2013.01); *G06F 3/04883* (2013.01); *G06F 2203/04806* (2013.01)

(58) Field of Classification Search
  CPC ....... G06F 3/04883; G06F 2203/04806; G01C 21/367; G01C 21/3664
  See application file for complete search history.

(56) References Cited

U.S. PATENT DOCUMENTS

| | | | |
|---|---|---|---|
| 9,423,942 | B2 | 8/2016 | Kawahara et al. |
| 2002/0011990 | A1 | 1/2002 | Anwar |
| 2003/0179219 | A1 | 9/2003 | Nakano |
| 2004/0021643 | A1 | 2/2004 | Hoshino |
| 2004/0243747 | A1 | 12/2004 | Rekimoto |
| 2005/0212979 | A1 | 9/2005 | Morita et al. |
| 2006/0022955 | A1* | 2/2006 | Kennedy ............... G06F 3/0414 345/173 |
| 2006/0072828 | A1 | 4/2006 | Silverbrook et al. |
| 2006/0161846 | A1 | 7/2006 | Van Leeuwen |
| 2008/0244456 | A1 | 10/2008 | Shimizu et al. |
| 2009/0122007 | A1 | 5/2009 | Tsuzaki et al. |
| 2009/0237371 | A1 | 9/2009 | Kim et al. |
| 2009/0315848 | A1* | 12/2009 | Ku ....................... G06F 3/0416 345/173 |
| 2009/0327977 | A1 | 12/2009 | Bachfischer et al. |
| 2010/0002016 | A1 | 1/2010 | Kim |
| 2010/0026723 | A1 | 2/2010 | Nishihara et al. |
| 2010/0033505 | A1 | 2/2010 | Hsieh |
| 2010/0056220 | A1 | 3/2010 | Oh et al. |
| 2010/0066695 | A1 | 3/2010 | Miyazaki |
| 2010/0085384 | A1 | 4/2010 | Kim et al. |
| 2011/0105193 | A1 | 5/2011 | Lee |
| 2011/0128164 | A1 | 6/2011 | Kang et al. |
| 2011/0157078 | A1 | 6/2011 | Miyazawa et al. |
| 2011/0234639 | A1 | 9/2011 | Shimotani et al. |
| 2012/0084692 | A1 | 4/2012 | Bae |
| 2012/0154331 | A1* | 6/2012 | Hasui ..................... G06F 3/0416 345/174 |
| 2013/0147702 | A1* | 6/2013 | Aaltonen ............... G06F 3/1423 345/156 |
| 2013/0239059 | A1 | 9/2013 | Chen |
| 2014/0082559 | A1* | 3/2014 | Suggs ....................... G06F 1/16 715/835 |
| 2014/0176477 | A1 | 6/2014 | Nakao |
| 2014/0176510 | A1 | 6/2014 | Nakao |
| 2014/0293165 | A1 | 10/2014 | Rekimoto |
| 2014/0300579 | A1 | 10/2014 | Rekimoto |

FOREIGN PATENT DOCUMENTS

| | | |
|---|---|---|
| JP | 2002-342033 | 11/2002 |
| JP | 2005-267049 | 9/2005 |
| JP | 2006-31499 | 2/2006 |
| JP | 2006-59238 | 3/2006 |
| JP | 2006-520024 | 8/2006 |
| JP | 2006-236143 | 9/2006 |
| JP | 2007-072233 | 3/2007 |
| JP | 2008-226282 | 9/2008 |
| JP | 2008-287323 | 11/2008 |
| JP | 2009-116769 | 5/2009 |
| JP | 2009-530726 | 8/2009 |
| JP | 2010-039278 | 2/2010 |
| JP | 2010-67135 | 3/2010 |
| JP | 2011-118857 | 6/2011 |
| JP | 2011-134271 | 7/2011 |
| JP | 2011-154524 | 8/2011 |
| WO | 2009/069392 | 6/2009 |
| WO | 2010/064423 | 6/2010 |
| WO | 2011/027665 | 3/2011 |

OTHER PUBLICATIONS

International Search Report and Written Opinion from PCT/JP2013/003132, dated Aug. 6, 2013.
Office Action in U.S. Appl. No. 14/235,832, dated Jun. 3, 2015.
Office Action in U.S. Appl. No. 14/235,832, dated Jan. 7, 2016.
Office Action (Notice of Allowance) in U.S. Appl. No. 14/235,832, dated Nov. 17, 2016.

* cited by examiner

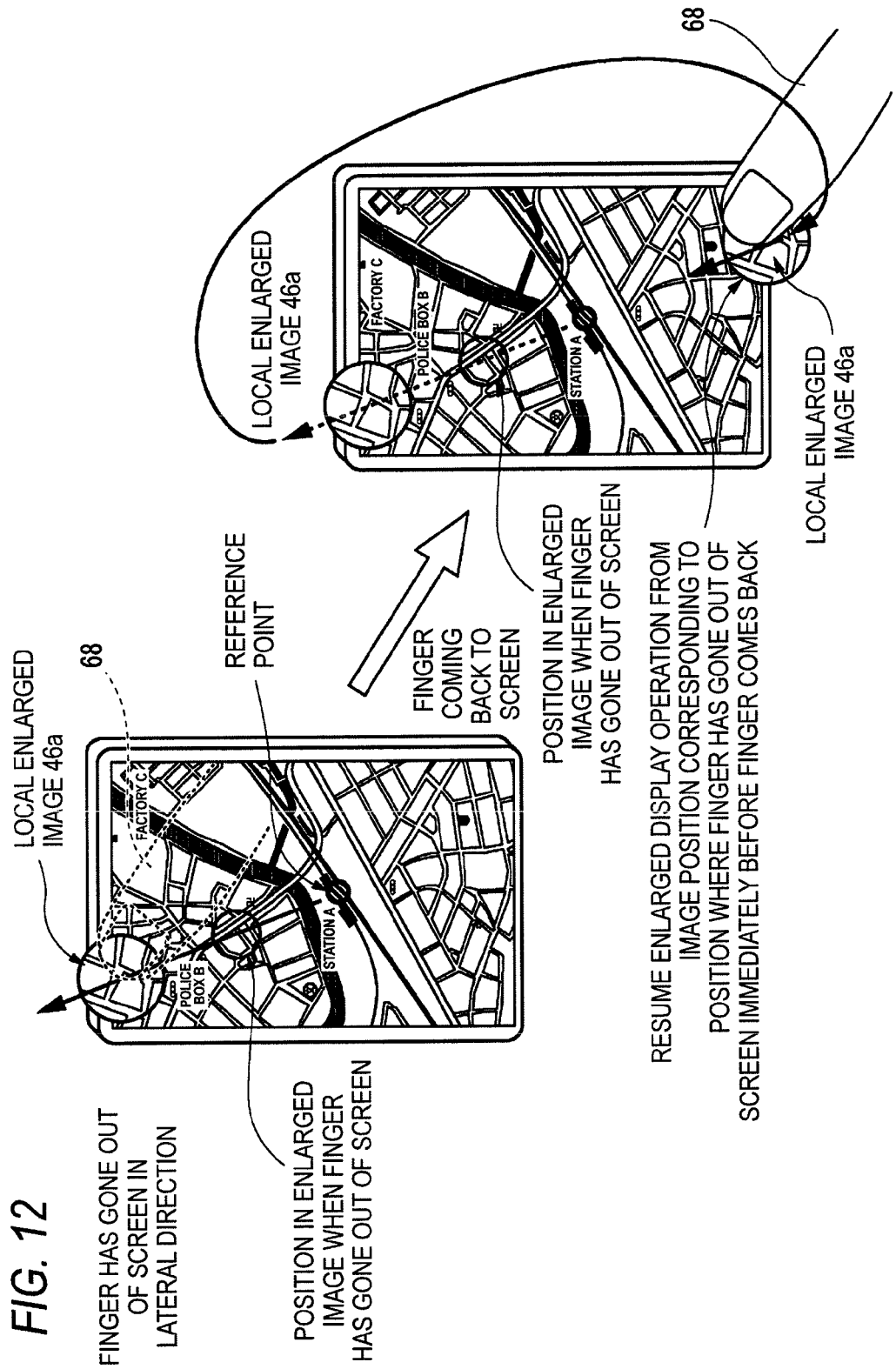

ENLARGING IMAGE BASED ON PROXIMITY OF A POINTING OBJECT TO A DISPLAY SCREEN

TECHNICAL FIELD

The present invention relates to a display device, a display control method, and a program for displaying data in accordance with an input operation accepted through a touch panel.

BACKGROUND ART

In recent years, a mobile terminal (such as a smartphone) including a touch panel mounted on a display section (such as an LCD (Liquid Crystal Display) or an organic EL (Electroluminescence) display) has been in widespread use. In displaying content (for example, a map) in a screen of the display section, the mobile terminal displays a wide-area map by reducing a display magnification or a detailed map (such as a local map around a specific spot) by increasing the display magnification in accordance with an input operation performed by a user.

As a related art of this type, a display device in which the operability of a touch panel is improved is known (see, for example, Patent Document 1). In order to allow a small button displayed in a screen to be accurately selected, the display device of Patent Document 1 enlargedly displays a button touched with a finger, so that selection of the enlargedly displayed portion can be settled after the finger has been moved away from the screen.

Besides, a non-contact type user input device including a touch panel for detecting proximity of a user finger is known (see, for example, Patent Document 2). The non-contact type user input device of Patent Document 2 includes a plurality of linear transmitting electrodes, a transmitter for supplying a transmission AC current to each of the transmitting electrodes, a plurality of linear receiving electrodes disposed so as not to be in contact with the transmitting electrodes, and a receiver for receiving an AC current flowing through each receiving electrode. A capacitor is provided on each of intersectional points between the transmitting electrodes and the receiving electrodes, and since a capacitor is formed in accordance with the proximity of a fingertip of a user, the electrostatic capacity of the capacitor is varied in accordance with the degree of proximity of the fingertip. On the basis of the variation of the electrostatic capacity, the non-contact type user input device can recognize a distance between the touch panel and the finger.

CITATION LIST

Patent Document

Patent Document 1: JP-A-2008-226282
Patent Document 2: JP-A-2002-342033

DISCLOSURE OF THE INVENTION

Problems to be Solved by the Invention

The conventional mobile terminals have, however, the following problems. Specifically, in the case where a user refers to or performs any operation on a portion around a specific spot in content such as a map, when the conventional mobile terminal locally displays the portion around the specific spot in the map, it is difficult for the user to comprehend a wide-area map. In other words, it is difficult to realize both the comprehension of a wide-area map and the reference to or the operation on a local map around a specific spot.

Besides, in the conventional mobile terminal, in order to check a detailed position around a specific spot, it is necessary for a user to perform an operation for changing the display magnification of the map (such as a pinching operation). Therefore, if a position on the map displayed as a result of the operation for changing the display magnification is different from a position desired by the user, it is necessary for the user to repeat the operation for changing the display magnification, which makes the operation troublesome.

Although the display device of Patent Document 1 can enlargedly display a portion touched with a finger, it is not probably presumed that the detail of content displayed in the screen is selectively switched in accordance with an input operation by a user.

Although Patent Document 2 describes that the proximity between a finger and the non-contact type user input device is detected, it is not probably presumed that the detail of content displayed in the screen is selectively switched in accordance with an input operation by a user.

The present invention is accomplished in consideration of these conventional circumstances, and an object is to provide a display device, a display control method, and a program in which the detail of content displayed in a screen can be selectively switched in accordance with an input operation performed in a touch panel by a user without requiring a complicated operation.

Means for Solving the Problems

The present invention includes: a display section which displays an image in a screen; a proximity detecting section which detects proximity of a finger to the screen; an image generating section which generates, in accordance with the detected proximity of the finger, an enlarged image by enlarging the image displayed in the screen with a prescribed enlarged display magnification; and a display control section which controls to display a local enlarged image corresponding to a part of the generated enlarged image in a superimposed manner over the image in a position in the screen vertically below the finger whose proximity has been detected.

Alternatively, the present invention is a display control method performed in a display device, including: a step of displaying an image in a screen; a step of detecting proximity of a finger to the screen; a step of generating an enlarged imaged by enlarging the image displayed in the screen with a prescribed enlarged display magnification in accordance with the detected proximity of the finger; and a step of displaying a local enlarged image corresponding to a part of the generated enlarged image in a superimposed manner over the image in a position in the screen vertically below the finger whose proximity has been detected.

Alternatively, the present invention is a program for causing a computer working as a display device to realize: a step of displaying an image in a screen; a step of detecting proximity of a finger to the screen; a step of generating an enlarged imaged by enlarging the image displayed in the screen with a prescribed enlarged display magnification in accordance with the detected proximity of the finger; and a step of displaying a local enlarged image corresponding to a part of the generated enlarged image in a superimposed manner over the image in a position in the screen vertically below the finger whose proximity has been detected.

According to these configurations, the detail of content displayed in a screen can be selectively switched in accordance with an input operation performed by a user on a touch panel without requiring a complicated operation.

Effects of the Invention

According to the present invention, the detail of content displayed in a screen can be selectively switched in accordance with an input operation performed in a touch panel by a user without requiring a complicated operation.

BRIEF DESCRIPTION OF DRAWINGS

FIG. 12 is an explanatory diagram illustrating the details of local enlarged images displayed when a finger has gone out of a screen in the lateral direction and when the finger has come back to the screen again in the lateral direction.

MODE FOR CARRYING OUT THE INVENTION

Figure 1:
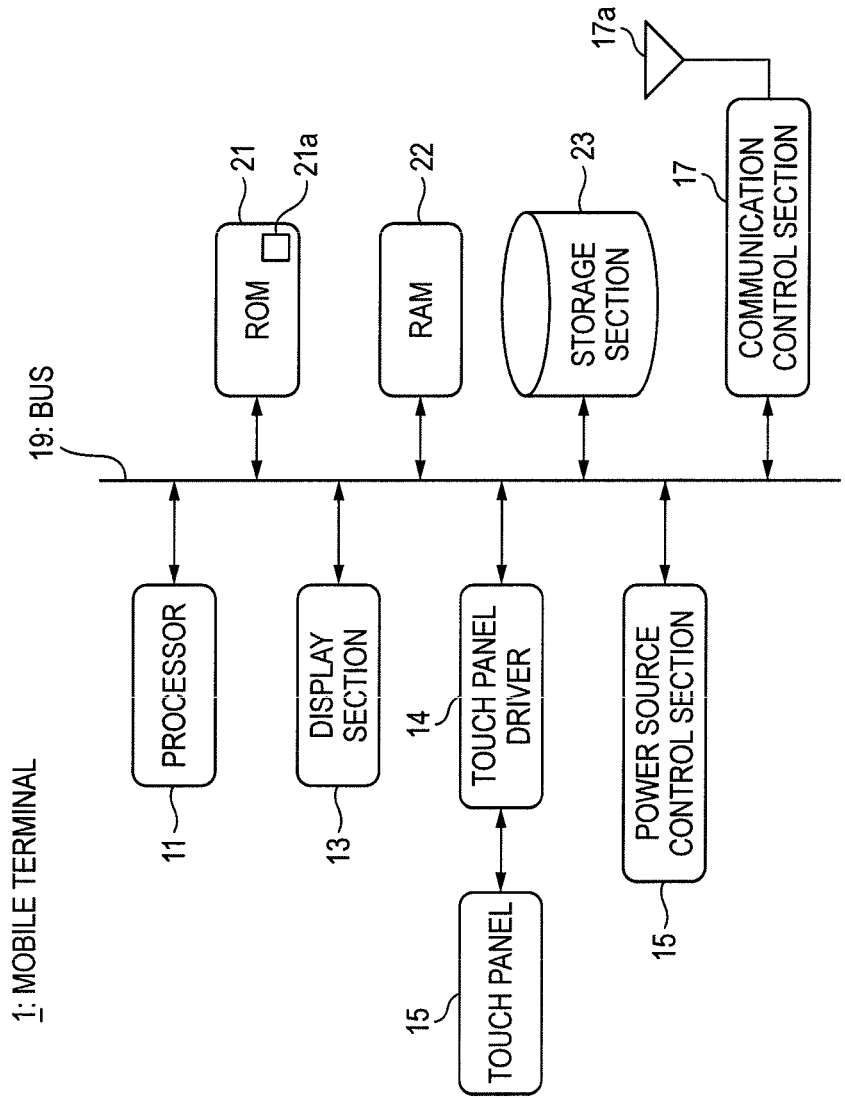
FIG. 1 is a block diagram illustrating a hardware configuration of a mobile terminal according to each embodiment.

Now, embodiments of a display device, a display control method, and a program of the present invention will be described with reference to the accompanying drawings. The display device of each embodiment is an electronic device including a display section for displaying data in a screen, such as a smartphone, a tablet terminal, a digital still camera, a PDA (personal digital assistant) or an electronic book terminal. In the following, a mobile terminal (such as a smartphone) is used for the description as an example of the display device of each embodiment, but it is noted that the mobile terminal of each embodiment is not limited to the aforementioned electronic devices.

Incidentally, the present invention can be expressed in the form of a display device as a device or in the form of a program for operating a display device as a computer. Besides, the present invention can be expressed in the form of a display control method including respective operations (steps) executed by a display device. In other words, the present invention can be expressed in any of the categories of a device, a method, and a program.

Furthermore, in the following description, an item that can accept a touch operation by a user so that a part of content of each application displayed in a screen of a display device (such as an LCD or an organic EL display) can be selected, or an item that can start prescribed processing of the content when selected is defined as a "button". The prescribed processing refers to, for example, processing for executing a detail pertaining to the content currently displayed in an application.

In the case where, for example, headlines of news are displayed as the content of an application, a "button" may be a hyperlinked character string, namely, each headline of the news, or an image (such as an icon or a software key of a keyboard) for encouraging a user to perform a selection operation, or a combination of a character string and an image. The display device can accept, in accordance with an input operation by a user, for example, selection of the "headline of the news" corresponding to the button as an operation performed on the button, and can display a detail of the news corresponding to the selected button. Incidentally, each "button" is defined in accordance with the application that has been started in the display device.

Alternatively, in the case where, for example, a map is displayed as the content of an application, a "button" may be a point on the map corresponding to a specific spot to which a user desires to refer or a specific spot to which a user desires to search for a route. The display device can accept, as an input operation performed on the button for the prescribed processing, for example, a search operation for a route from the present location to the specific spot corresponding to the button, in accordance with an input operation by the user, and can search for and display the corresponding route.

Furthermore, two axes on the horizontal plane of a touch panel are defined as the x-axis and the y-axis, and a vertical direction to the touch panel, namely, an axis corresponding to the vertical direction to (the height direction from) the touch panel, is defined as the z-axis. In addition, in the following description, "coordinates" include a position on the horizontal plane of the touch panel, namely, coordinates (x, y) defined by a combination of an x-coordinate and a y-coordinate, as well as coordinates (x, y, z) using these coordinates (x, y) and a distance in the vertical direction (the height direction) between the touch panel and a finger, namely, a height z of the finger above the touch panel.

Incidentally, the following description will be given by using a finger of a user as an example of an instruction medium used on the touch panel, but the instruction medium is not limited to a finger but may be a conductive stylus held by a hand of a user. Besides, the instruction medium is not especially limited as long as it is a medium whose proximity to and touch on the touch panel can be detected in accordance with the structure and the detection method employed in the touch panel.

Moreover, in the following description, an operation to hold a finger in a spatial position away from the plane of the touch panel is defined as a "hover operation", and an operation to slide the finger held in the spatial position by the hover operation substantially parallel to the plane of the touch panel is defined as a "hover-slide operation". Accordingly, an operation to directly touch the plane of the touch panel with a finger is not a "hover operation" but a "touch operation". Furthermore, a distance (proximity distance) between a finger and the plane of the touch panel in a hover operation or a hover-slide operation is in inverse proportion to electrostatic capacity detected by the touch panel, and therefore, corresponds to a range of the electrostatic capacity detectable by the touch panel.

Besides, the following description will be given by using a map as an example of content so as to make the description easily understood, and an image initially displayed with a reference display magnification (of, for example, one time) employed before performing enlarged display in accordance with an application of the mobile terminal of each embodiment is defined as an "original image".

Embodiment 1

(Hardware Configuration of Mobile Terminal Common to Respective Embodiments)

FIG. 1 is a block diagram illustrating the hardware configuration of a mobile terminal 1 of each embodiment. The mobile terminal 1 includes a processor 11, a display section 13, a touch panel driver 14, a touch panel 15, a power source control section 16, a communication control section 17 connected to an antenna 17a, a ROM (Read Only Memory) 21, a RAM (Random Access Memory) 22 and a storage section 23.

The processor 11, the display section 13, the touch panel driver 14, the power source control section 16, the communication control section 17, the ROM 21, the RAM 22 and the storage section 23 are connected to one another through a bus 19 so that data can be mutually input/output.

The processor 11 is constructed by using, for example, a CPU (Central Processing Unit), an MPU (Micro Processing Unit), or a DSP (Digital Signal Processor), and comprehensively controls the mobile terminal 1 and performs other various arithmetic processing or control processing. The processor 11 reads programs and data stored in the ROM 21, and performs various processing of each embodiment described later.

Figure 2:
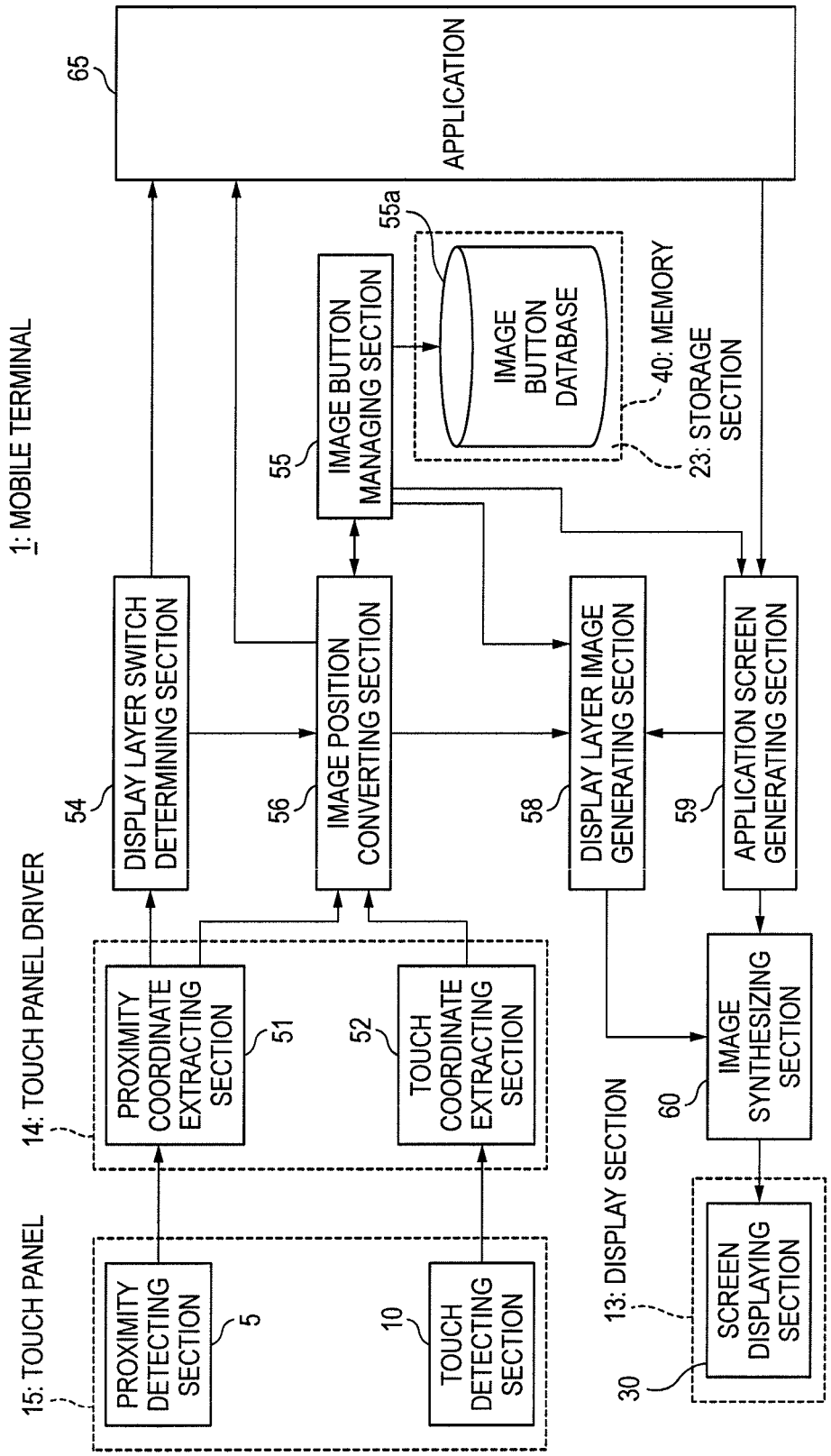
FIG. 2 is a block diagram illustrating a functional configuration of the mobile terminal.

The ROM 21 stores an application 65 (see FIG. 2) installed in the mobile terminal 1, and programs and data to be used when the processor 11 executes processing of various parts illustrated in FIG. 2. Besides, the ROM 21 stores a table 21a described later.

The RAM 22 works as a work memory to be used in the operation of the processor 11, the touch panel driver 14 or the communication control section 17.

The storage section 23 is constructed by using a hard disk or a flash memory built in the mobile terminal 1, and stores data acquired or generated by the mobile terminal 1. It is noted that the application 65 is stored in the storage section 23. The storage section 23 may be constructed by using, instead of a hard disk or a flash memory, an external storage medium (such as a USB memory) connected via, for example, a USB (Universal Serial Bus) terminal.

The display section 13 is constructed by using, for example, an LCD or organic EL (Electroluminescence) display, and displays, in a screen, data output by the processor 11 or the touch panel driver 14.

The touch panel driver 14 controls the operation of the touch panel 15 and monitors an input operation performed by a user on the touch panel 15. For example, if the touch panel 15 detects a touch by a touch operation or proximity by a hover operation performed by a user with a finger 68 (see FIG. 3), the touch panel driver 14 obtains contact coordinates (x, y) or proximity coordinates (x, y, z), and outputs information of the contact coordinates (x, y) or the proximity coordinates (x, y, z) to the processor 11, the RAM 22 or the storage section 23. Hereinafter, the contact coordinates (x, y) are designated as the "touch coordinates (x, y)".

The touch panel 15 is mounted on a screen 45 (see FIG. 3) of the display section 13, and detects a touch operation performed on the horizontal plane of the touch panel 15 with the finger 68 of a user. Besides, the touch panel 15 detects proximity to the touch panel 15 of the finger 68 of a user due to a hover operation.

Incidentally, although the specific structure of the touch panel 15 is not herein described because it is described in detail in, for example, Patent Document 2 mentioned above, and the touch panel 15 detects a proximity state of the finger 68 if a height z of the finger in a hover operation is equal to or smaller than a prescribed value zth, or electrostatic capacity determined in accordance with the height z of the finger is equal to or larger than a prescribed value.

The power source control section 16 is constructed by using a power source (such as a battery) for the mobile terminal 1, and turns on/off the power to the mobile terminal 1 in accordance with an input operation performed on the touch panel 15. When the power is in an on state, the power source control section 16 supplies power from the power source to the respective components illustrated in FIG. 1 so as to place the mobile terminal 1 in an operable state.

The communication control section 17 is constructed by using a wireless communication circuit, and transmits data obtained as a result of processing performed by the processor 11 and further receives data transmitted from a base station or another communication terminal not shown. Besides, in the mobile terminal 1 of FIG. 1, components necessary for describing each embodiment below are illustrated, and the mobile terminal may further include a voice control section for controlling a voice call, a microphone for collecting a voice of a user, and a speaker for outputting voice data of a person on the line.

(Functional Configuration of Mobile Terminal 1)

Next, the functional configuration of the mobile terminal 1 common to the respective embodiments will be described with reference to FIG. 2. FIG. 2 is a block diagram illustrating the functional configuration of the mobile terminal 1.

The mobile terminal 1 of FIG. 2 includes a proximity detecting section 5, a touch detecting section 10, a screen displaying section 30, a memory 40, a proximity coordinate extracting section 51, a touch coordinate extracting section 52, a display layer switch determining section 54, an image position converting section 56, an image button managing section 55, a display layer image generating section 58, an application screen generating section 59, an image synthesizing section 60, and the application 65.

The proximity detecting section 5 detects a state where the finger 68 has come close to the touch panel 15 due to a hover operation. The proximity detecting section 5 outputs, to the proximity coordinate extracting section 51, proximity information that the finger has come close to the touch panel 15.

The touch detecting section 10 detects an operation of touching the touch panel 15 with the finger 68 due to a touch operation. The touch detecting section 10 outputs, to the touch coordinate extracting section 52, contact information that the finger 68 has touched the touch panel 15. Incidentally, the proximity detecting section 5 and the touch detecting section 10 can be constructed by using the touch panel 15, and although the proximity detecting section 5 and the touch detecting section 10 are illustrated as separate components in FIG. 2, they may be constructed together as the touch panel 15.

The screen displaying section 30 corresponds to the display section 13 of FIG. 1, and displays, on the screen 45, synthesized image data output from the image synthesizing section 60 described later. The synthesized image data refers to data obtained, by the image synthesizing section 60, by synthesizing data of a screen of the application 65 (hereinafter simply referred to as the "application screen") and image data generated by the display layer image generating section 58.

The memory 40 corresponds to the RAM 22 or the storage section 23 of FIG. 1, and is constructed at least as an image button database 55a. The image button data base 55a stores, for example, screen data and image data used in the application 65, image data generated by the application 65, an enlarged image generated flag corresponding to that image data of an enlarged image has already been generated, image data received from a base station or another communication terminal not shown, and coordinate information of a button used in the application 65 and operation information of the application 65 allocated to the button.

Incidentally, the memory 40 may temporarily store each information of proximate coordinates (x, y, z) extracted by the proximate coordinate extracting section 51 or touch coordinates (x, y) extracted by the touch coordinate extracting section 52. In FIG. 2, arrows from the proximity coordinate extracting section 51 and the touch coordinate extracting section 52 to the memory 40 are omitted for avoiding complication of the drawing.

The proximity coordinate extracting section 51 calculates and extracts the proximity coordinates (x, y, z) of the finger 68 to the touch panel 15 on the basis of the proximity information output from the proximity detecting section 5, and sets coordinates (x, y), which correspond, out of the proximity coordinates (x, y, z), to a position on the touch panel vertically below the finger 68, as a reference point 75 (described later). In the proximity coordinates (x, y, z), the x component and the y component are coordinate values corresponding to a position on the horizontal plane of the touch panel 15, and the z component is a coordinate value corresponding to a distance in the vertical direction between the finger 68 and the touch panel 15, namely, a height of the finger 68 above the touch panel 15. The proximity coordinate extracting section 51 output information of the extracted proximity coordinates (x, y, z) and the reference point (x, y) respectively to the display layer switch determining section 54 and the image position converting section 56.

The display layer switch determining section 54 determines whether or not image data of an enlarged image 46 (see FIG. 3) has been already generated. The display layer switch determining section 54 inquires of the image button managing section 55, for example, whether or not an enlarged image generated flag indicating that the image data of the enlarged image 46 has been already generated is stored in the memory 40, and on the basis of an inquiry result output from the image button managing section 55, determines whether or not the enlarged image 46 has been already generated.

If it is determined based on the inquiry result output from the image button managing section 55 that the image data of the enlarged image 46 has not been generated yet, the display layer switch determining section 54 determines that the image data of the enlarged image having the reference point 75 of the image data of the original image at substantially the center is to be generated on the basis of the information of the reference point 75 (x, y) and the proximity coordinates (x, y, z) output from the proximity coordinate extracting section 51.

For example, if the value of the height z exceeds a prescribed threshold value zth, the display layer switch determining section 54 determines that the image data of the enlarged image having the reference point 75 of the image data of the original image at substantially center is not to be generated. The prescribed threshold value zth is a threshold value for determining whether or not the proximity detecting section 5 can detect a proximity state of the finger 68 to the touch panel 15, and is also a threshold value for determining whether or not the display layer switch determining section 54 is to generate the image data of the enlarged image having the reference point 75 of the image data of the original image at substantially the center.

If it is determined that the image data of the enlarged image is to be generated, the display layer switch determining section 54 outputs, respectively to the image position converting section 56 and the application 65, information of an enlarged display magnification precedently set in the operation of the display layer switch determining section 54 and an enlarged image generation instruction for generating the image data of the enlarged image. Incidentally, the number of information of the enlarged display magnification is one in the present embodiment, but the number is not limited to one but information of a plurality of enlarged display magnifications may be provided in accordance with the value of the height z of the finger 68 above the touch panel 15 (which will be described in detail in Embodiment 2).

The image button managing section 55 reads/writes information corresponding to display coordinates on the screen 45 of various buttons involved in the application screen used in the application 65 in/from the memory 40.

The image position converting section 56 specifies, on the basis of the information of the reference point (x, y) output from the proximity coordinate extracting section 51, which position in the original image the position of the fingertip, namely, the position on the touch panel vertically below the finger 68, corresponds to. Incidentally, the position specified by the image position converting section 56 is not a position in the original image specified depending on the physical size in the display section 13, for example, a position on the touch panel 15 vertically below the finger 68, but a position specified by logical coordinate information of the image data of the original image, for example, a position specified by the longitude and the latitude of the original image if the content is a map.

The image position converting section 56 outputs, to the display layer image generating section 58, the information of the enlarged display magnification and the enlarged image generation instruction output from the display layer switch determining section 54, and the information of the specified position in the original image corresponding to the reference point (x, y) output from the proximity coordinate extracting section 51.

The image position converting section 56 outputs the enlarged image generation instruction to the display layer image generating section 58 continuously at prescribed short time intervals. For example, if the finger 68 is moved substantially in parallel to the horizontal plane of the touch panel 15 due to a hover-slide operation, the image position converting section 56 outputs, to the display layer image generating section 58, an enlarged image generation instruction for an enlarged image corresponding to the moved fingertip.

Besides, the image position converting section 56 inquires of the image button managing section 55 whether or not any button is provided in the touch coordinates (x, y) based on the information of the touch coordinates (x, y) output from the touch coordinate extracting section 52. The image position converting section 56 determines, on the basis of an inquiry result output from the image button managing section 55, whether or not any button is provided in the touch coordinates (x, y). If it is determined that a button is provided in the touch coordinates (x, y), the image position converting section 56 outputs, to the application 65, selection information that the button corresponding to the touch coordinates (x, y) has been selected by the touch operation with the finger 68.

On the basis of the enlarged image generation instruction and the information of the specified position in the original image corresponding to the reference point (x, y) output from the image position converting section 56, the display layer image generating section 58 acquires, from the memory 40 via the image button managing section 55, the image data of the original image including the coordinates (x, y) of the reference point and image data (such as an icon) of the button included in the image data of the original image. On the basis of information of a display range of the image data of the original image output from the application screen generating section 59, the information of the enlarged display magnification, the enlarged image generation instruction, and the information of the specified position in the original image corresponding to the reference point (x, y), the display layer image generating section 58 generates, by using the image data of the original image and the image data of the button thus acquired, image data of an enlarged image formed by enlarging, with the enlarged display magnification, the image data of the original image including the position of the reference point of the image data of the original image corresponding to the fingertip.

Besides, the display layer image generating section 58 cuts out image data of a part of the enlarged image corresponding to a prescribed range from the generated image data of the enlarged image on the basis of information of a prescribed range precedently defined in the operation of the display layer image generating section 58. The display layer image generating section 58 outputs, to the image synthesizing section 60, the cut image data of the part of the enlarged image, namely, image data of a local enlarged image in which a portion around a specific spot is locally enlarged.

Furthermore, since the enlarged image generation instruction is continuously output from the image position converting section 56, the display layer image generating section 58 continuously cuts out the image data of the enlarged image. For example, if the finger 68 is moved due to a hover-slide operation, on the basis of a distance between a reference point corresponding to the position of the moved fingertip and a reference point corresponding to the position of the fingertip before the movement (namely, relative movement of the finger) and a ratio in the display magnification between the original image and the enlarged image described later, the image position converting section 56 outputs, to the display layer image generating section 58, information of the position in the moving direction of the finger according to a multiplication result of the ratio and the relative movement of the finger. The display layer image generating section 58 continues to cut out image data of a prescribed range of the enlarged image including a position corresponding to the information output from the image position converting section 56 (see FIG. 5).

Accordingly, in the case where the image data of the enlarged image is displayed over the image data of the original data in a superimposed manner as described later (see FIG. 4), if the finger 68 is moved substantially in parallel to the touch panel 15 due to a hover-slide operation, the display layer image generating section 58 cuts out image data of an enlarged image according to the relative movement of the finger 68 starting from the reference point 75 (see FIG. 4) in the image data of the enlarged image before moving the finger 68 and the ratio of the display magnification.

The application screen generating section 59 generates, on the basis of a screen generation instruction issued by the application 65, image data of an application screen to be used in the application 65 by using the image data of the original image acquired from the memory 40 via the image button managing section 55. The application screen generating section 59 outputs the generated image data, namely, information of a display range of the image data of the original image, to the display layer image generating section 58, and outputs the generated image data to the image synthesizing section 60.

Incidentally, although the application screen generating section 59 and the application 65 are illustrated as separate components in FIG. 2, the application 65 may be provided with the function of the application screen generating section 59 so as to be configured as the application 65 working as both the application screen generating section 59 and the application 65.

The image synthesizing section 60 working as a display control section synthesizes the image data of the screen 45 (see FIG. 4) output from the application screen generating section 59 and the image data of the enlarged image of a local enlarged image 46a (see FIG. 4) output from the display layer image generating section 58. The image synthesizing section 60 causes the screen displaying section 30 to display the synthesized image data.

(Operation Outline of Mobile Terminal 1)

Next, the outline of the operation of the mobile terminal 1 of Embodiment 1 will be described with reference to FIGS. 3 to 5.

Figure 3:
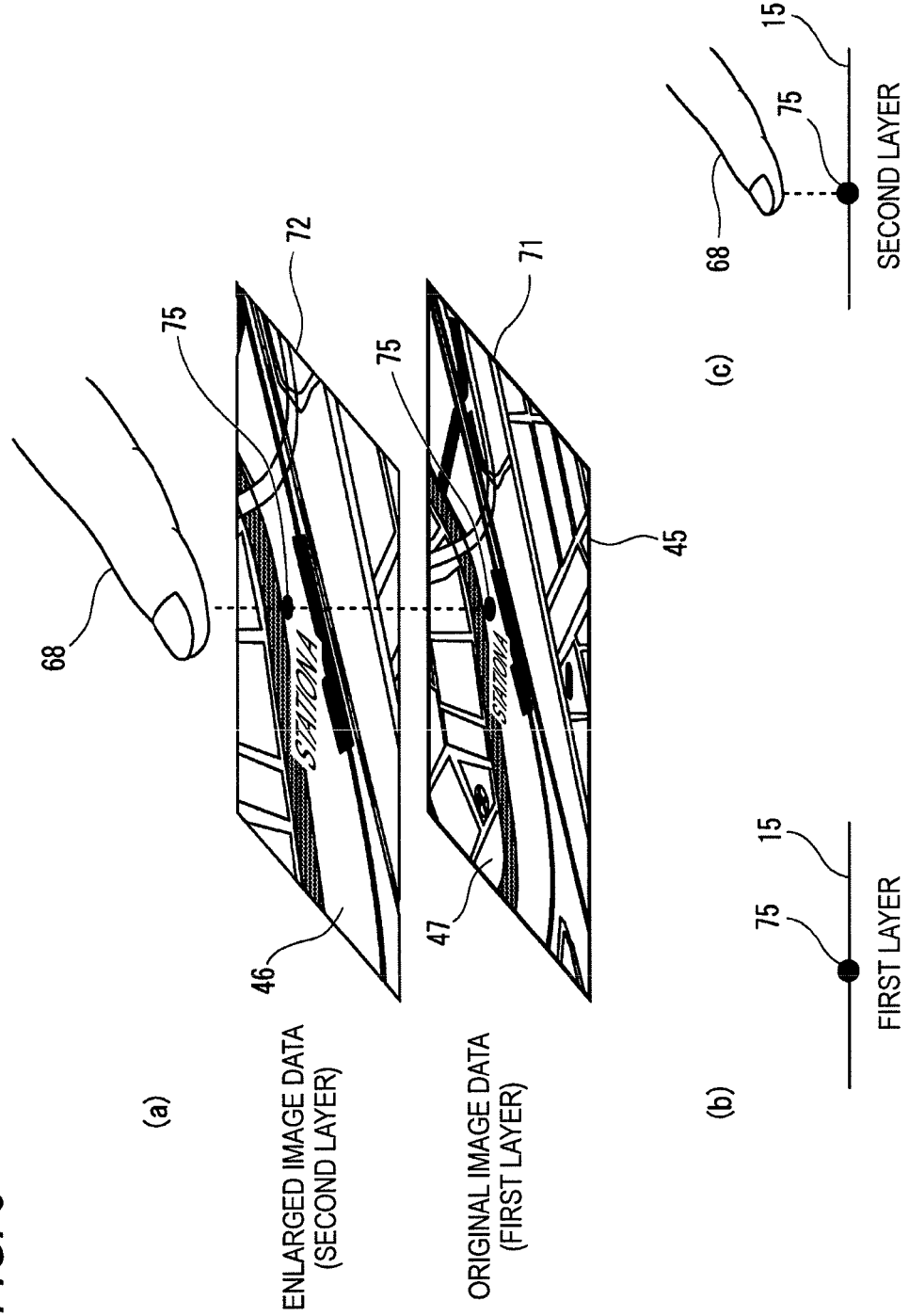
FIG. 3(a) is an explanatory diagram illustrating the concept of an original image and an enlarged image corresponding to respective layers.
FIG. 3(b) is a diagram illustrating the relationship between a first layer corresponding to the original image and a finger.
FIG. 3(c) is a diagram illustrating the relationship between a second layer corresponding to the enlarged image and a finger.

FIG. 3(*a*) is an explanatory diagram illustrating the concept of respective layers of an original image and an enlarged image. FIG. 3(*b*) is a diagram illustrating the relationship between a first layer 71 corresponding to an original image 47 and a finger 68. FIG. 3(*c*) is a diagram illustrating the relationship between a second layer 72 corresponding to an enlarged image 46 and a finger 68. In the present embodiment, the two layers, that is, the layer 71 of image data of the original image 47 and the layer 72 of image data of the enlarged image 46 formed by enlarging the image data of the original image 47 with an enlarged display magnification, are set respectively as the first layer 71 and the second layer 72. It is noted that the image data set as the respective layers is stored in the storage section 23 (the memory 40).

Accordingly, in FIG. 3, the image data of the original image of the original image 47 (such as an image of a map) is set as the layer 71. In detecting the proximity of the finger 68 when the finger 68 comes close to the touch panel 15 mounted on the screen 45, the display layer switch determining section 54 sets the reference point 75 in the image data of the original image 47. Specifically, the display layer switch determining section 54 initially sets, as the reference point 75 in the layer 71, a position of the finger 68 on the touch panel 15 where the proximity of the finger 68 to the touch panel 15 is detected (namely, a black circle portion near "Station A" in the original image 47 of FIG. 3). If the original image is set as the first layer as illustrated in FIG. 3(*b*), the proximity state between the finger 68 and the touch panel 15 is not detected. In the case where the enlarged image is set as the second layer as illustrated in FIG. 3(*c*), however, the proximity state between the finger 68 and the touch panel 15 is detected.

When the proximity of the finger 68 is detected, the display layer image generating section 58 generates image data of the enlarged image 46 having the reference point 75 at substantially the center, and outputs, to the display layer switch determining section 54, an enlarged image generated flag indicating that the image data of the enlarged image 46 has been generated. On the basis of the enlarged image generated flag output from the display layer image generating section 58, the display layer switch determining section 54 sets the image data of the enlarged image 46 as the second layer 72. It is noted that an arrow provided between the display layer image generating section 58 and the display layer switch determining section 54 is omitted in FIG. 2 for avoiding the complication of the drawing.

The enlarged image 46 of FIG. 3 is an image formed by enlarging the original image 47 to have the reference point 75 at substantially the center. In FIG. 3, the image data of the original image 47 is displayed in the screen 45, and image data of the enlarged image 46 corresponding to a movable range of the finger 68 of a user, namely, the size (the physical size) of the screen 45, is generated.

After generating the enlarged image 46, the display layer image generating section 58 cuts out image data of the enlarged image of the enlarged image corresponding to a part of the size of the screen 45 from the image data of the enlarged image 46 according to the size (the physical size) of the screen 45 of the display section 13. Incidentally, the display layer image generating section 58 may generate image data of a local enlarged image formed by enlarging a part of the original image, out of the whole size of the image data of the original image 47, according to the information of the prescribed range output from the image position converting section 56 to have the reference point 75 at substantially the center.

In this manner, the mobile terminal 1 can display, in the screen 45 of the display section 13 the local enlarged image 46*a* corresponding to a part of the enlarged image 46 over the original image 47 in a superimposed manner within a frame 48 (see FIG. 4) having a size corresponding to the information of the prescribed range precedently defined in the operation of the display layer image generating section 58. Furthermore, a specific spot on the map corresponding to a fingertip, which is difficult to be visually recognized by a user because it is behind the finger 68 when the touch panel 15 is touched with the finger 68 in the conventional technique, can be clearly recognized by a user because the finger 68 is spaced from the touch panel 15 in the mobile terminal 1 of the present embodiment owing to a hover operation.

Next, the outline of the operations of a conventional mobile terminal and the mobile terminal 1 of the present embodiment performed in moving the finger 68 with the local enlarged image displayed will be described with reference to FIGS. 4 and 5. FIG. 4 is an explanatory diagram illustrating an example where a local enlarged image 46*c* around a "target spot 46*d*" or a local enlarged image 46*b* around "Police Box B" is displayed by movement of the finger 68 over a distance a of a vector A or a distance a' of a vector A' in the conventional technique. FIG. 5 is an explanatory diagram illustrating an example where a local enlarged image 46*c* around a "target spot 46*d*" is displayed by movement of the finger 68 over a distance a' of a vector A' in the present embodiment. In FIGS. 4 and 5, the description will be given by using a map as an example of the content for simplifying the description.

First, when the finger 68 is brought close to the touch panel 15, the local enlarged image 46*a* including, at substantially the center, the position of the fingertip, namely, the position (the reference point 75) on the touch panel 15 (the screen 45) vertically below the finger 68, is enlargedly displayed in the frame 48. Specifically, the local enlarged image 46*a* is displayed in a display region within the frame 48 in the screen 45, and the original image 47 of the enlarged image 46 is displayed in a display region other than the frame 48 in the screen 45. In FIG. 4, the position of "Station A" is set as the reference point 75. Incidentally, the size of the frame 48 may be arbitrarily changeable.

With the local enlarged image 46*a* around "Station A" set as the reference point 75 displayed in the frame 48, it is assumed that a user wants to select the target spot 46*d*, which is displayed so small that it is difficult to select with the display magnification of the original image 47, and wants to display the local enlarged image 46*c* around the target spot 46*d* for searching a route from "Station A" corresponding to the reference point 75 to the target spot 46*d*. With the local enlarged image 46*a* displayed in the frame 48, when the finger 68 moves, the detail of the local enlarged image 46*a* displayed in the frame 48 is switched in accordance with the moving direction of the finger 68.

Figure 4:
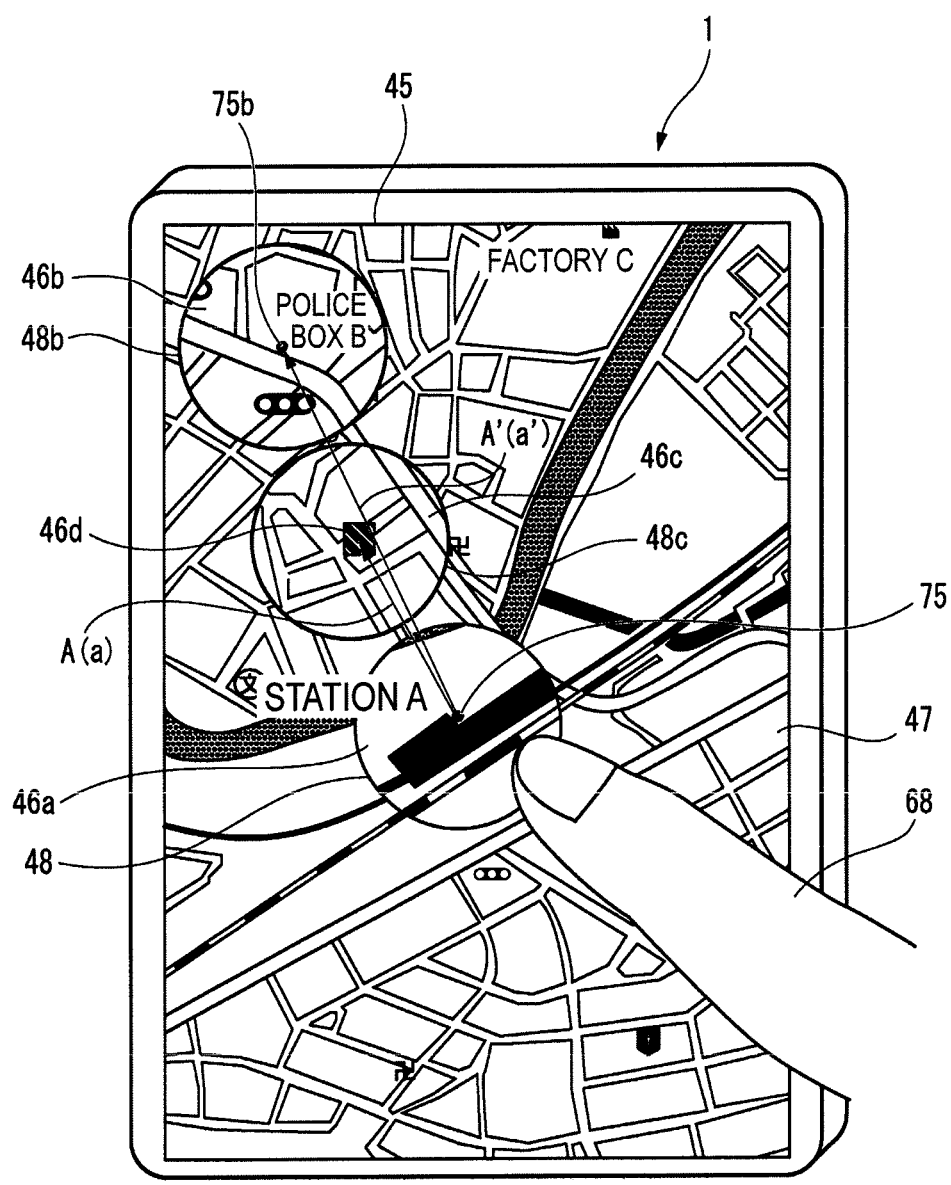
FIG. 4 is an explanatory diagram illustrating an example in which a local enlarged image around a "target spot" or a local enlarged image around "Police Box B" is displayed in accordance with movement of a finger over a distance a or a distance a' in a conventional technique.

In the conventional technique, however, the detail of the local enlarged image 46*a* displayed in the frame 48 is switched, by the movement of the finger 68 toward an upper left direction in FIG. 4 over the distance a, in accordance with the display magnification (of, for example, one time) of the image data of the original image 47. In other words, if the finger 68 moves toward the upper left direction in FIG. 4 over the distance a, the detail of the local enlarged image 46*a* displayed in the frame 48 is affected not by the display magnification of the image data of the enlarged image 46 but by the display magnification of the image data of the original image 47, and hence, the local enlarged image 46*c* around the target spot 46*d* away from the reference point 75 by the distance a is displayed.

In the conventional technique, the detail of the local enlarged image 46*a* to be switched in accordance with the movement of the finger 68 is affected by the display magnification of the image data of the original image 47, and therefore, in some cases, it is difficult to move the finger 68 to a position not largely away from the reference point 75 (such as the target spot 46*d*), namely, it is difficult to finely adjust the movement distance of the finger 68. If the finger 68 can be properly moved substantially by the distance a, the local enlarged image 46*c* around the target spot 46*d* away from the reference point 75 substantially by the distance a can be displayed as the detail of the local enlarged image 46*a*, but if the finger is moved by a distance beyond or smaller than the distance a even just a little, it is difficult to display the local enlarged image 46*c* around the target spot 46*d*. In particular, in the case where a map image with a large scale (of, for example, 1 to 20,000) is displayed, if the adjustment of the movement distance of the finger 68 is even slightly shifted, a map image displayed as a result is largely different from a map image of an area desired by a user, and thus, it is difficult to comfortably perform the operation.

Assuming that, for example, the original image 47 is a map of a scale of 1 to 20,000 and the enlarged image 46 is a map of a scale of 1 to 10,000, if the relative movement of the finger 68 from the reference point 75, namely, the distance a' between the reference point 75 and a reference point 75*b* corresponding to the destination of the finger 68, is 3 cm, the detail of the local enlarged image 46*a* displayed in the frame 48 is switched to the detail of a local enlarged image 46*b* of a position resulting from the movement by a distance (600 m) calculated in accordance with the scale (of 1 to 20,000) of the image data of the original image 47 and the relative movement (3 cm) of the finger 68. In other words, if the finger 68 moves toward the upper left direction in FIG. 4 over the distance a', a portion around "Police Box B" is displayed as the local enlarged image 46*b* in a frame 48*b*.

Figure 5:
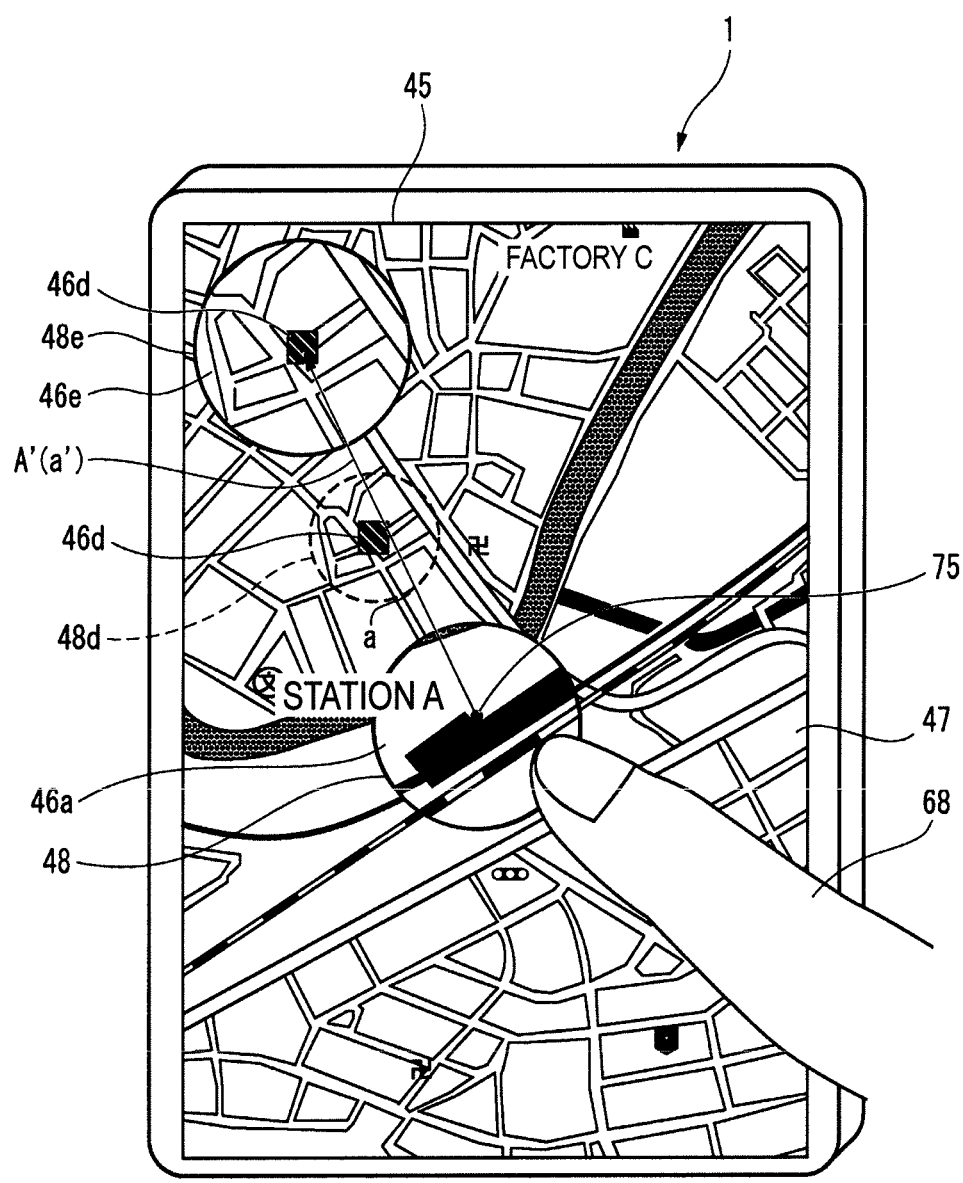
FIG. 5 is an explanatory diagram illustrating an example in which a local enlarged image around a "target spot" is displayed in accordance with movement of a finger over a distance a' in the present embodiment.

In the present embodiment, in the case where the finger 68 moves toward the upper left direction in FIG. 5 over the distance a', the detail of the local enlarged image 46*a* displayed in the frame 48 is switched in accordance with a ratio between the display magnification (of, for example, one time) of the image data of the original image 47 and the display magnification (of, for example, two times) of the image data of the enlarged image 46, and the relative movement of the finger 68 from the reference point 75. Therefore, a portion around the target spot 46*d* (see a broken line circle 48*d* of FIG. 5) is displayed as a local enlarged image 46*e* corresponding to the destination of the finger 68 in a frame 48*e* (see FIG. 5). After displaying the portion around the target spot 46*d* as the local enlarged image 46*e* in the frame 48*e*, if the target spot 46*d* is selected by a touch operation with the finger 68, the mobile terminal 1 can execute, for example, route search from "Station A" corresponding to the reference point 75 to the target spot 46*d* as a continuous operation (a series of operations).

Accordingly, in the case where, for example, the map of the original image 47 has a scale of 1 to 20,000 and the map of the enlarged image 46 has a scale of 1 to 10,000, it is assumed that the finger 68 moves from the reference point 75 to a position (away from the reference point 75 by the distance a') away twice as much as a distance to a position (away from the reference point 75 by the distance a (see FIG. 4)) of the button of the target spot 46*d*. In this case, the mobile terminal 1 of the present embodiment displays, as the local enlarged image 46*e* corresponding to the destination of the finger 68 in the frame 48*e*, the detail of the position (the broken line circuit 48*d* of FIG. 5) moved from the reference point 75 by movement of the finger 68 (corresponding to the distance a of FIG. 4) corresponding to a multiplication result of a ratio between the display magnification (of, for example, 1 to 20,000) of the image data of the original image 47 and the display magnification (of, for example, 1 to 10,000) of the image data of the enlarged image 46 (namely, ½) and the relative movement of the finger 68 (that is, the distance a') from the reference point 75. Incidentally, the reference point in the local enlarged image 46*e* enlargedly displayed as a result of the movement of the finger 68 by the distance a' is the position of the finger 68 resulting from the movement by the distance a', namely, the position of the target spot 46*d* in the local enlarged image 46*e* (the enlarged image 46).

In this manner, the mobile terminal 1 of the present embodiment switches a local enlarged image on the basis of a ratio between the scale (the display magnification) of the map of the original image 47 and the scale (the display magnification) of the map of the enlarged image 46, and the relative movement of the finger 68, and therefore, a local enlarged image can be simply switched as desired by a user, and the fine adjustment of the movement of a local enlarged image in a map with the finger 68 can be easily performed.

(Operation of Mobile Terminal 1 of Embodiment 1)

Figure 6:
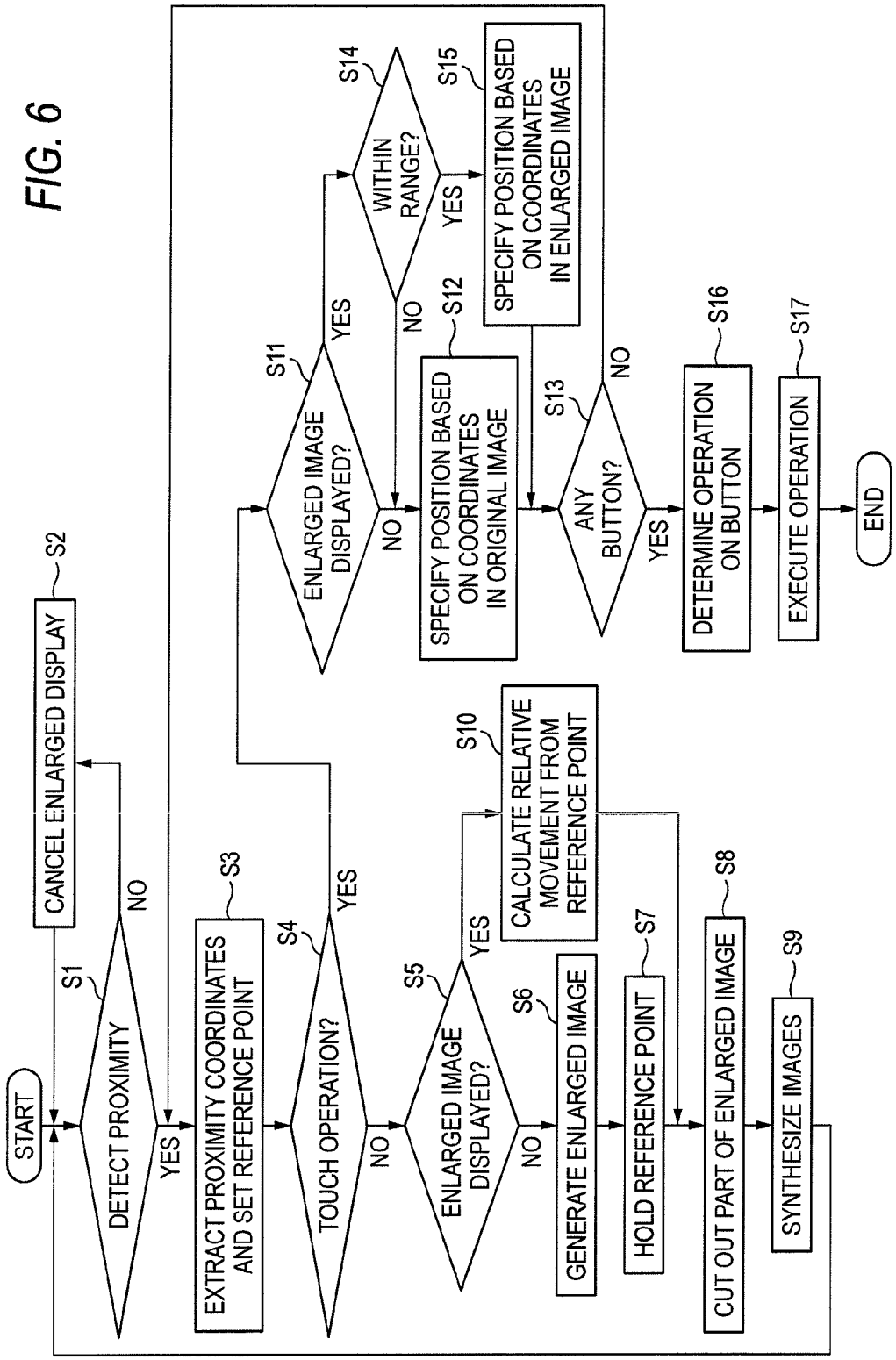
FIG. 6 is a flowchart illustrating operational procedures of the mobile terminal according to Embodiment 1.

FIG. 6 is a flowchart illustrating operational procedures of the mobile terminal 1 of Embodiment 1. The flowchart of FIG. 6 illustrates the operational procedures of the mobile terminal 1 performed when the finger 68 of a user comes close to the touch panel 15 or when a touch operation is performed in the case where the image data of the original image 47 is displayed in the screen 45 of the display section 13 of the mobile terminal 1.

Incidentally, it is assumed in the description of FIG. 6 that the image data of the original image 47 displayed in the screen 45 is set as the first layer (the layer 71) by the display layer switch determining section 54.

In FIG. 6, first, the proximity detecting section 5 detects whether or not the finger 68 of a user has come close to the touch panel 15 due to a hover operation (S1). If the proximity detecting section 5 detects that the finger 68 of the user has not come close to the touch panel 15 due to a hover operation (S1, NO), it outputs, to the proximity coordinate extracting section 51, information that the finger 68 has not come close the touch panel 15. The proximity coordinate extracting section 51 outputs, to the display layer switch determining section 54, the information that the finger 68 has not come close to the touch panel 15.

The display layer switch determining section 54 determines, on the basis of the output from the proximity coordinate extracting section 51, whether or not image data of an enlarged image has been generated, and if it is determined that the image data of the enlarged image has been generated, it causes the image button managing section 55 to delete the image data of the enlarged image from the memory 40. Thus, the mobile terminal 1 resets display of the image data of the enlarged image (S2). Incidentally, the operation of the display layer switch determining section 54 for determining whether or not the image data of the enlarged image has been generated will be described in detail in step S5. It is noted that the operation of step S2 is omitted if the image data of the enlarged image has not been generated.

If the proximity detecting section 5 detects that the finger 68 has come close to the touch panel 15 (S1, YES), it outputs, to the proximity coordinate extracting section 51, proximity information that the finger 68 has come close to the touch panel 15. The proximity coordinate extracting section 51 calculates and extracts proximity coordinates (x, y, z) of the finger 68 to the touch panel 15 on the basis of the proximity information output from the proximity detecting section 5 (S3).

Furthermore, the proximity coordinate extracting section 51 sets, as a reference point 75 of the original image coordinates (x, y) corresponding to a position on the touch panel 15 vertically below the finger 68 out of the proximity coordinates (x, y, z) (S3). The proximity coordinate extracting section 51 outputs information of the extracted proximity coordinates (x, y, z) and the reference point (x, y) respectively to the display layer switch determining section 54 and the image position converting section 56.

Next, the touch detecting section 10 detects whether or not the finger 68 has touched the touch panel 15 (S4). If the touch detecting section 10 does not detect a touch operation with the finger 68 on the touch panel 15 (S4, NO), the operation of the mobile terminal 1 proceeds to step S5.

The display layer switch determining section 54 determines whether or not an enlarged image 46 has been already generated (S5). In step S5, the display layer switch determining section 54 inquires of the image button managing section 55, for example, whether or not an enlarged image generated flag is stored in the memory 40, and determines, on the basis of an inquiry result output from the image button managing section 55, whether or not the enlarged image 46 has been already generated.

If it is determined that the enlarged image 46 has not been generated (S5, NO), the display layer switch determining section 54 determines that image data of an enlarged image having the reference point 75 of the image data of the original image at substantially the center is to be generated on the basis of the information of the reference point 75 (x, y) and the proximity coordinates (x, y, z) output from the proximity coordinate extracting section 51.

If it is determined that the image data of the enlarged image is to be generated, the display layer switch determining section 54 outputs, to the image position converting section 56, information of an enlarged display magnification precedently set in the operation of the display layer switch determining section 54 and an enlarged image generation instruction for generating the image data of the enlarged image.

The image position converting section 56 specifies, on the basis of the information of the reference point (x, y) output from the proximity coordinate extracting section 51, which position in the original image the position of the fingertip, namely, the position on the touch panel 15 vertically below the finger 68, corresponds to. Furthermore, the image position converting section 56 outputs, to the display layer image generating section 58, information of the enlarged display magnification output from the display layer switch determining section 54, the enlarged image generation instruction and the information of the specified position in the original image corresponding to the reference point (x, y) output from the proximity coordinate extracting section 51.

On the basis of the enlarged image generation instruction and the information of the specified position in the original image corresponding to the reference point (x, y) output from the image position converting section 56, the display layer image generating section 58 acquires, from the memory 40 via the image button managing section 55, the image data of the original image including the coordinates (x, y) of the reference point 75 and image data (such as an icon) of a button included in the image data of the original image.

By using the image data of the original image and the image data of the button thus acquired, the display layer image generating section 58 generates, on the basis of information of a display range of the image data of the original image output from the application screen generating section 59, the enlarged image generation instruction and the information of the specified position in the original image corresponding to the reference point (x, y), image data of an enlarged image formed by enlarging, with the enlarged display magnification, the image data of the original image including, at substantially the center, the position of the reference point 75 of the image data of the original image corresponding to the fingertip (S6).

The display layer image generating section 58 outputs an enlarged image generated flag to the display layer switch determining section 54. The display layer switch determining section 54 sets the image data of the enlarged image 46 as a layer 72 on the basis of the enlarged image generated flag output from the display layer image generating section 58.

The display layer image generating section 58 holds the information of the reference point (x, y) of the image data of the generated enlarged image (S7). Furthermore, the display layer image generating section 58 cuts out image data of a partial enlarged image (local enlarged image) corresponding to a prescribed range of the image data of the generated enlarged image on the basis of the information of a prescribed range precedently defined in the operation of the display layer image generating section 58 (S8). The display layer image generating section 58 outputs, to the image synthesizing section 60, the image data of the partial enlarged image thus cut out, namely, the image data of the local enlarged image in which a portion around a specific spot is locally enlarged.

The image synthesizing section 60 synthesizes screen data of the screen 45 output from the application screen generating section 59 and the image data of a local enlarged image 46a (see FIG. 3) output from the display layer image generating section 58 (S9). The image synthesizing section 60 causes the screen displaying section 30 to display the synthesized image. Thereafter, the operation of the mobile terminal 1 returns to step S1.

On the other hand, if it is determined in step S5 that the enlarged image 46 has already been generated (S5, YES), the display layer switch determining section 54 calculates relative movement of the finger 68 defined by the reference point (x, y) of the image data of the enlarged image 46 already generated in Step S7 and coordinates (x1, y1) corresponding to the current position on the touch panel 15 vertically below the finger 68 (S10). The display layer switch determining section 54 outputs the calculated relative movement of the finger 68 to the image position converting section 56.

On the basis of a distance between a reference point corresponding to the position of the moved finger and a reference point corresponding to the position of the finger before the movement (i.e., the relative movement of the finger 68, see the distance a' of FIG. 5) and a ratio in the display magnification between the original image 47 and the enlarged image 46, the image position converting section 56 outputs, to the display layer image generating section 58, information of the position of the finger 68 in a moving direction according to a multiplication result of the ratio and the relative movement of the finger. The display layer image generating section 58 cuts out image data of the enlarged image corresponding to the prescribed range including the position corresponding to the information output from the image position converting section 56 (S8).

Next, if it is determined in step S4 that the touch detecting section 10 has detected a touch operation with the finger 68 on the touch panel 15 (S4, YES), the touch coordinate extracting section 52 acquires information of the detection of the touch operation from the touch detecting section 10 and outputs information of touch coordinates (x, y) to the display layer switch determining section 54. The display layer switch determining section 54 determines, on the basis of the information of the touch coordinates (x, y) output from the touch coordinate extracting section 52, whether or not the enlarged image 46 has been already generated (S11). The determination method employed in step S11 is the same as that employed in step S5, and hence the description of the specific determination method will be omitted. Incidentally, an arrow provided between the touch coordinate extracting section 52 and the display layer switch determining section 54 is omitted in FIG. 2 for avoiding the complication of the drawing.

If it is determined that the image data of the enlarged image 46 has not been generated (S11, NO), the display layer switch determining section 54 outputs, to the image position converting section 56, information that the image data of the enlarged image 46 has not been generated. The image position converting section 56 specifies, on the basis of the touch coordinates (x, y) output from the touch coordinate extracting section 52 and the output from the display layer switch determining section 54, and on the basis of coordinate information of the image data of the original image 47, which position in the original image 47 the position of the touch coordinates (x, y) corresponds to (S12). After step S12, the operation of the mobile terminal 1 proceeds to step S13.

Furthermore, in the case where the display layer switch determining section 54 determines that the enlarged image 46 has been generated (S11, YES), the operation of step S12 is executed even if the image position converting section 56 determines that the touch coordinates (x, y) are out of the range of the enlarged image 46 in the screen 45 where the original image 47 and the enlarged image 46 are displayed in a superimposed manner (S14, NO).

On the other hand, if it is determined that the touch coordinates (x, y) fall in the range of the enlarged image 46 in the screen 45 where the original image 47 and the enlarged image 46 are displayed in a superimposed manner (S14, YES), the image position converting section 56 specifies, on the basis of the coordinate information of the enlarged image 46, which position in the enlarged image the position of the touch coordinates (x, y) corresponds to (S15). Incidentally, the coordinate information of the enlarged image 46 is coordinate information corresponding to a logical position in the original image corresponding to a logical position having been touched in the local enlarged image.

After specifying the position of the touch coordinates (x, y) in step S12 or S15, the image position converting section 56 inquires of the image button managing section 55 whether or not there is any button in the position specified in the screen 45. The image position converting section 56 determines, on the basis of an inquiry result from the image button managing section 55, whether or not there is any button in the specified position in the screen 45 (S13). If it is determined that there is no button (S13, NO), the operation of the mobile terminal 1 returns to step S3.

If it is determined that there is any button (S13, YES), the image position converting section 56 outputs, to the application 65, information that the button has been pressed by the touch operation of step S4. The application 65 determines an operation corresponding to the button (S16), and executes the determined operation (S17). Thereafter, the operation of the mobile terminal 1 of FIG. 6 is terminated.

Incidentally, after the proximity of the finger 68 is once detected in step S1, if the finger 68 goes away from the touch panel 15 in the vertical direction to the touch panel 15 so that its proximity cannot be detected during processing performed after step S2, the mobile terminal 1 may display the original image 47 alone in the screen 45 and return to the processing of step S1. Thus, the mobile terminal 1 can be easily restored to screen display of the original image alone, and thus, the user operation can be simplified.

In this manner, in the case where the proximity of the finger 68 is detected, the mobile terminal 1 of Embodiment 1 generates an enlarged image including, at substantially the center, a reference point 75 of an original image displayed in the screen 45, and displays, in the screen 45 of the displaying section 13, a local enlarged image corresponding to a prescribed range including, at substantially the center, the reference point of the generated enlarged image and the original image in a superimposed manner.

Thus, the mobile terminal 1 can efficiently perform an operation on details of the image displayed in the screen 45, so as to remarkably improve the operability for a user, and the detail of content (such as a map image) displayed in the screen can be selectively switched in accordance with an input operation performed by a user on the touch panel without requiring a complicated operation.

Furthermore, in the case where the local enlarged image and the original image are displayed in a superimposed manner, on the basis of relative movement (a distance) of the finger 68 caused due to a hover-slide operation with the finger 68, and a ratio in the display magnification between the original image and the enlarged image, the mobile terminal 1 switches the detail of the local enlarged image to a local enlarged image of a prescribed range including the position of the finger in the moving direction according to a multiplication result of the ratio and the relative movement of the finger. Therefore, the detail of a local enlarged image can be simply finely adjusted in the mobile terminal 1 by a hover-slide operation with the finger 68 as compared with the conventional technique, and thus, the operability for a user can be improved.

Besides, since a local enlarged image is displayed in the displaying section 13, the mobile terminal 1 can perform an operation of searching for a target spot and selecting the target spot (for example, a search operation for a route from a present location set as the reference point to a target spot) with a simple operation (such as combination of a hover-slide operation and a touch operation).

Embodiment 2

Embodiment 1 describes the exemplified case where the local enlarged image 46a corresponding to the prescribed range including the reference point 75 of the original image 47 at substantially the center is displayed, when the mobile terminal 1 detects the proximity of the finger 68, over the original image 47 by using the information of the precedently defined enlarged display magnification.

Embodiment 2 will describe an exemplified case where the enlarged display magnification is varied depending on the proximity distance of a finger 68, namely, the value of a height z of the finger 68 above a touch panel 15, and a local enlarged image 46a enlarged with the varied enlarged display magnification is displayed over an original image 47.

A mobile terminal 1 of Embodiment 2 has the same configuration as the mobile terminal 1 of Embodiment 1, and therefore, in the mobile terminal 1 of Embodiment 2, like reference signs used for like elements used in the mobile terminal 1 of Embodiment 1 will be used for omitting the description, and differences will be described.

Figure 7:
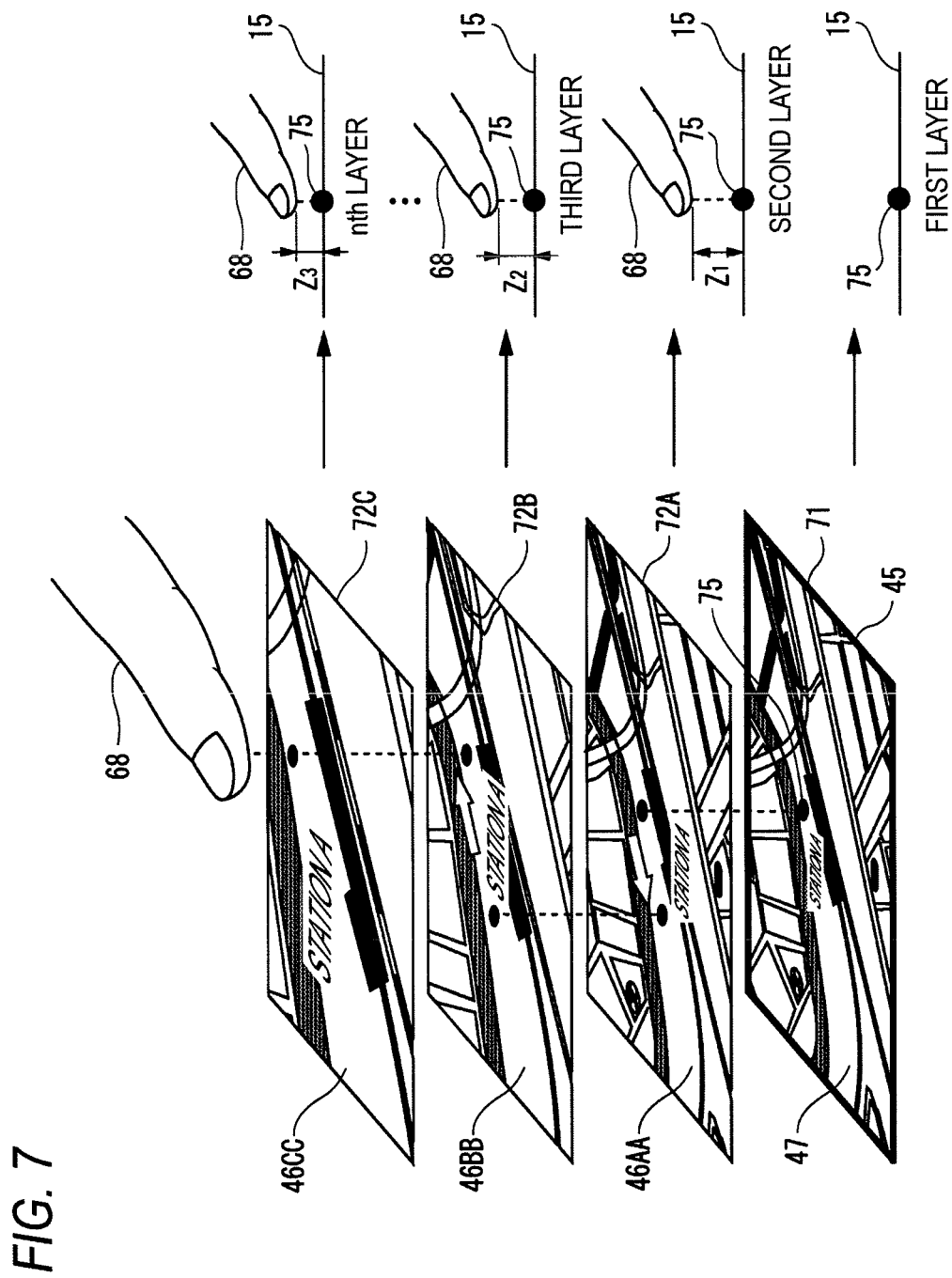
FIG. 7 is an explanatory diagram illustrating the relationship between a value of a height z of a finger and an enlarged image corresponding to the value of the height z in Embodiment 2.

FIG. 7 is an explanatory diagram illustrating the relationship between values of the height z of the finger 68 and enlarged images 46AA, 46BB and 46CC corresponding to the respective values of the height z in Embodiment 2. The first enlarged image 46AA is set as a second layer 72A corresponding to a higher layer of a first layer 71 as which an original image 47 is set. Besides, in the same manner as in Embodiment 1, two layers are set also in the present embodiment.

For example, if the second enlarged image 46BB, which is formed by further enlarging the first enlarged image 46AA, is set as a second layer 72B, the first enlarged image 46AA is set as the first layer 71.

Similarly, if the third enlarged image 46CC, which is formed by further enlarging the second enlarged image 46BB, is set as a second layer 72C, the second enlarged image 46BB is set as the first layer 71. In the same manner, although not illustrated in FIG. 7, an nth enlarged image of the fourth or the following enlarged image formed by further enlarging the third enlarged image 46CC is set as the second layer with a (n−1)th enlarged image set as the first layer 71.

In FIG. 7, after displaying the original image 47 in the screen 45 to be set as the first layer 71, if the proximity of the finger 68 is detected in a position at a height $z_1$ above the touch panel 15, the first enlarged image 46AA formed by enlarging the original image 47 with a first enlarged display magnification is generated to be set as the second layer 72A. Besides, in the second layer 72A, a reference point 75 (see a black circle in FIG. 7) moves by moving the finger 68 substantially in parallel to the touch panel 15 (see a thick outlined arrow of the second layer 72A) in the same manner as in Embodiment 1.

After generating the first enlarged image 46AA to be set as the second layer 72A, it is assumed that the finger 68 comes closer to the touch panel 15 and the proximity is detected in a position at a height $z_2$. In this case, the first enlarged image 46AA is set as the first layer 71, and the second enlarged image 46BB formed by enlarging the original image with a second enlarged display magnification is generated to be set as the second layer 72B. Besides, in the second layer 72B, the reference point 75 moves by moving the finger 68 substantially in parallel to the touch panel 15 (see a thick outlined arrow of the second layer 72B) in the same manner as in Embodiment 1.

Similarly, after generating the second enlarged image 46BB to be set as the second layer 72B, it is assumed that the finger 68 comes further closer to the touch panel 15 and the proximity is detected in a position at a height $z_3$. In this case, the second enlarged image 46BB is set as the first layer 71, and the third enlarged image 46CC formed by enlarging the original image with a third enlarged display magnification is generated to be set as the second layer 72C.

Figure 8:
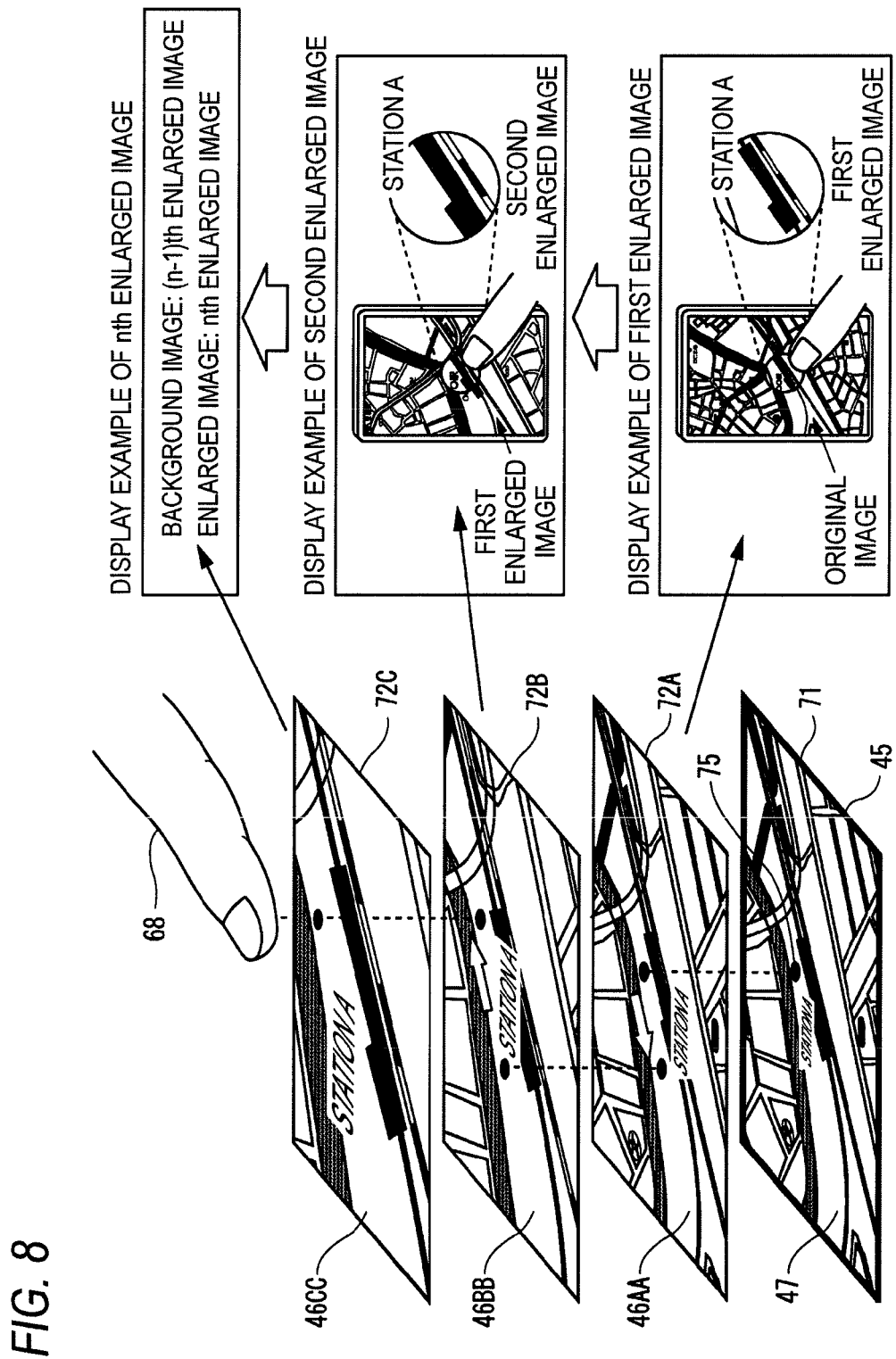
FIG. 8 is an explanatory diagram illustrating the relationship between an enlarged image and a background image displayed over each enlarged image in Embodiment 2.

FIG. 8 is an explanatory diagram illustrating the relationship between an enlarged image and a background image displayed over each enlarged image in Embodiment 2. In FIG. 8, an enlarged image corresponds to a local enlarged image 46*a* displayed in the frame 48 of the screen 45 of the displaying section 13 of the mobile terminal 1, and the background image corresponds to an image displayed in the screen 45 excluding the local enlarged image 46*a*.

In the present embodiment, if the detail of a local enlarged image corresponding to a part of the first enlarged image 46AA is displayed as the enlarged image, the detail of the original image 47 is displayed as the background image.

Alternatively, if the detail of a local enlarged image corresponding to a part of the second enlarged image 46*66* is displayed as the enlarged image, the detail of the first enlarged image 46AA is displayed as the background image.

Similarly, if the detail of a local enlarged image corresponding to a part of an nth enlarged image is displayed as the enlarged image, the detail of an (n−1)th enlarged image is displayed as the background image.

It is noted that the original image 47 may be always displayed as the background image.

Figure 9:
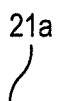
FIG. 9 is a diagram illustrating a specific example of a table showing the relationship between the value of the height z of a finger and an enlarged display magnification.

FIG. 9 is a diagram of a specific example of a table 21*a* showing the relationship between the value of the height z of the finger 68 and the enlarged display magnification. In the present embodiment, in accordance with a distance between the finger 68 and the touch panel 15, namely, the value of the height z of the finger 68, the enlarged display magnification of the local enlarged image 46*a* is varied. Although the table 21*a* is stored in the ROM 21 in FIG. 1, the table 21*a* may be stored in the storage section 23.

In the table 21*a*, if the height z of the finger 68 is, for example, from 30 mm to a threshold value zth [mm], the original image 47, namely, the original image 47 with an enlarged display magnification of 1 [time], is set as the first layer 71, and the second layer 72 is not set. In this case, the mobile terminal 1 displays the original image 47 in the whole area of the screen 45 of the displaying section 13.

If the height z of the finger 68 is, for example, from 25 to 30 mm, the original image 47, namely, the original image 47 with an enlarged display magnification of 1 [time], is set as the first layer 71, and a first enlarged image 46A, namely, a first enlarged image 46A with the enlarged display magnification of 5 [times], is set as the second layer 72A.

Alternatively, if the height z of the finger 68 is, for example, from 20 to 25 mm, the first enlarged image 46A, namely, the first enlarged image 46A with an enlarged display magnification of 5 [times], is set as the first layer 71, and a second enlarged image 46B, namely, a second enlarged image 46B with an enlarged display magnification of 10 [times], is set as the second layer 72A.

Similarly, if the height z of the finger 68 is, for example, from 0 to 5 mm, an (n−1)th enlarged image, namely, an (n−1)th enlarged image with an enlarged display magnification of 50 [times], is set as the first layer 71, and an nth enlarged image, namely, an nth enlarged image with an enlarged display magnification of 100 [times], is set as the second layer 72A.

The display layer switch determining section 54 switches the information of the enlarged display magnification for an image in accordance with the information (the value) of the height z of the finger 68 above the touch panel 15 by referring to the table 21*a* of FIG. 9.

Incidentally, the display layer switch determining section 54 may employ the hysteresis concept so that it may not frequently switch the display magnification of the enlarged image if the finger 68 is positioned around a boundary value of the height z shown in Table 9. When the hysteresis concept is not employed, according to the table 21*a*, if the finger 68 is at a height of, for example, 24 mm above the touch panel 15, the enlarged display magnification of 10 times is employed, and if the finger 68 moves away by 2 mm to be at a height of 26 mm, the enlarged display magnification of 5 times is employed.

In this manner, the mobile terminal 1 of the present embodiment can avoid frequent switching of the detail of the screen otherwise caused by a slight difference in the height of the finger 68 when the finger 68 is stopped in a state of a hover operation around the height z of about 25 mm above the touch panel 15.

(Operation of Mobile Terminal 1 in Embodiment 2)

Figure 10:
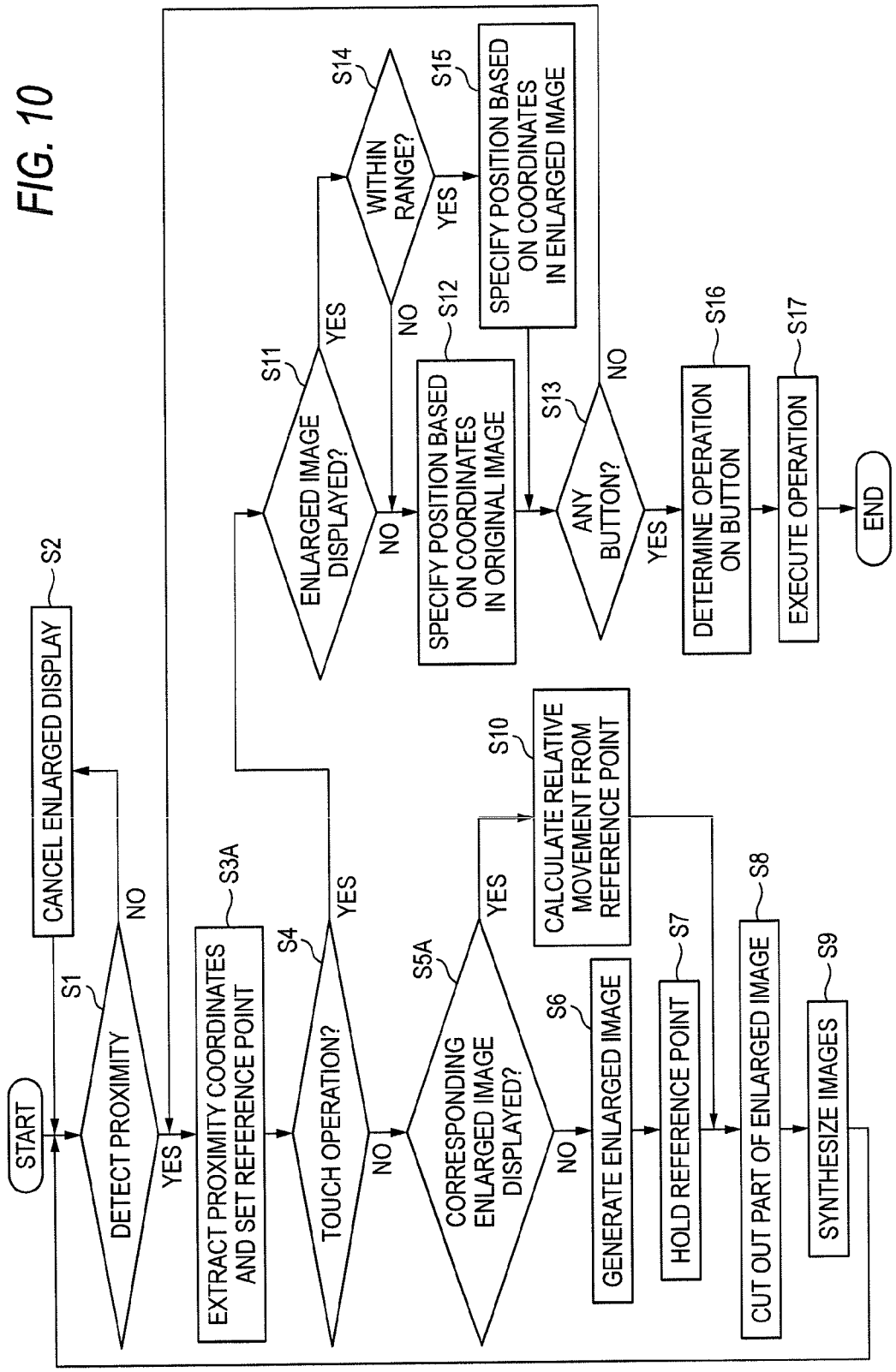
FIG. 10 is a flowchart illustrating operational procedures of the mobile terminal performed in Embodiment 2.

FIG. 10 is a flowchart illustrating the operational procedures of the mobile terminal 1 of Embodiment 2. As for the processing contents the same as those shown in the flowchart of FIG. 6, like step numbers are used to omit the description, and different processing contents will be described.

If the proximity of the finger 68 to the touch panel 15 is detected (S1, YES), the proximity detecting section 5 outputs, to the proximity coordinate extracting section 51, proximity information that the finger 68 has come close to the touch panel 15. The proximity coordinate extracting section 51 calculates and extracts, on the basis of the proximity information output from the proximity detecting section 5, proximity coordinates (x, y, z) of the finger 68 to the touch panel 15 (S3A). In the proximity coordinates (x, y, z) extracted in step S3A, the value of the z coordinate corresponds to the distance between the finger 68 and the touch panel 15, namely, the value of the height z of the finger 68 above the touch panel 15 (see FIG. 9).

Furthermore, the proximity coordinate extracting section 51 sets the coordinates (x, y), out of the proximity coordinates (x, y, z), corresponding to the position on the touch panel 15 vertically below the finger 68 as the reference point 75 of the original image (S3A). The proximity coordinate extracting section 51 outputs information of the extracted proximity coordinates (x, y, z) and the reference point (x, y) respectively to the display layer switch determining section 54 and the image position converting section 56.

Next, the touch detecting section 10 detects whether or not the finger 68 has touched the touch panel 15 (S4). If the touch detecting section 10 has not detected the touch operation with the finger 68 on the touch panel 15 (S4, NO), the operation of the mobile terminal 1 proceeds to step S5A.

The display layer switch determining section 54 switches the enlarged display magnification for an image by referring to the table 21a of FIG. 9 in accordance with the information of the height z of the finger 68 above the touch panel 15. The display layer switch determining section 54 determines whether or not an enlarged image enlarged with a switched enlarged display magnification is being displayed in the screen 45 of the displaying section 13 (S5A).

If it is determined in step S5A that the enlarged image enlarged with the enlarged display magnification having been switched in accordance with the value of the height z of the finger 68 above the touch panel is not being displayed (S5A, NO), the enlarged image enlarged with the switched enlarged display magnification is generated in step S6 in the same manner as in Embodiment 1.

On the other hand, it is determined in step S5A that the enlarged image enlarged with the enlarged display magnification having been switched in accordance with the value of the height z of the finger 68 above the touch panel is being displayed (S5A, YES), the display layer switch determining section 54 calculates, in the same manner as in Embodiment 1, relative movement of the finger 68 defined based on the reference point (x, y) of the image data of the enlarged image 46 already generated in step S7 and coordinates (x1, y1) of the current position on the touch panel 15 vertically below the finger 68 (S10). The display layer switch determining section 54 outputs the calculated relative movement of the finger 68 to the image position converting section 56.

On the basis of a distance between a reference point corresponding to the moved fingertip and a reference point corresponding to the fingertip before the movement (i.e., the relative movement of the finger 68, see the distance a' illustrated in FIG. 5) and a ratio in the display magnification between the original image 47 and the enlarged image 46, the image position converting section 56 outputs, to the display layer image generating section 58, information of a position of the finger 68 in the moving direction according to a multiplication result of the ratio and the relative movement of the finger. The display layer image generating section 58 cuts out image data of the enlarged image of a prescribed range including the position corresponding to the information output from the image position converting section 56 (S8). The processing performed after this processing is the same as that illustrated in FIG. 6 and performed in Embodiment 1.

In this manner, the mobile terminal 1 of Embodiment 2 selectively switches the enlarged display magnification of an enlarged image to be enlargedly displayed in accordance with the value of the height z of the finger 68 above the touch panel 15. Furthermore, with an enlarged image enlarged with the switched enlarged display magnification set as a local enlarged image, and with an enlarged image enlarged with an enlarged display magnification closest to but lower than the switched enlarged display magnification set as a background image, the mobile terminal 1 causes the local enlarged image and the background image to be displayed in a superimposed manner in the screen of the displaying section 13.

Therefore, when the finger 68 is brought roughly to a target spot in an image with a large scale (for displaying a large area), the mobile terminal 1 can enlargedly display an image around a specific spot corresponding to the fingertip, and when the finger 68 is brought closer to the touch panel 15 while moving substantially in parallel to the touch panel 15, an enlarged image further enlarged can be displayed. Accordingly, the mobile terminal 1 can simply display a desired specific spot by a user finely adjusting a position in the displayed image.

In this manner, in the mobile terminal 1, the position of a desired specific spot is finely adjusted roughly with an image having a large scale (for displaying a large area) displayed, and the position of the desired specific spot can be gradually displayed by gradually changing the enlarged display magnification by changing the distance between the finger 68 and the touch panel 15 (namely, the value of the height z of the finger 68 above the touch panel 15). Accordingly, the mobile terminal 1 of the present embodiment can smoothly display a specific spot desired by a user without repeating a pinching operation and a sliding operation many times as in the conventional technique.

The various embodiments have been described with reference to the accompanying drawings so far, and it goes without saying that the present invention is not limited to these examples. It will be apparent for those skilled in the art that various changes and modifications can be made in the embodiments and the embodiments can be variously combined within the scope of the appended claims, and such changes and modifications are intended to be included within the technical scope of the present invention.

Besides, as described above, while displaying a local enlarged image, if a touch operation with a finger is performed on a specific position (button) in the original image not corresponding to the local enlarged image, the mobile terminal 1 may perform an operation the same as that performed when no local enlarged image is displayed. Thus, it can be operated in the same manner as in the normal operation performed when no local enlarged image is displayed but merely the original image is displayed.

Furthermore, the aforementioned embodiments describes the case where a map is displayed in the screen 45 of the mobile terminal 1 with a specific spot locally enlargedly displayed, but the present invention is applicable to cases where the following screens are displayed.

The present invention is effective in a case where, for example, with a text image displayed in a wide screen, a frame of a local enlarged image is to be moved to a position desired to be read. Besides, it is effective in a case where, example, a local portion of a high resolution image including a painting is desired to be checked or edited. It is also effective in a case where the content of browser is displayed in the screen 45. Furthermore, it is effective in a case where, for example, a large number of thumbnail images classified visually in accordance with colors are to be efficiently retrieved.

It is also effective in a case where visually index expressed information is to be efficiently retrieved. Besides, it is also effective in a case where an analysis result of big data or information having logical connection between items and having been structured (such as mind map information) is to be efficiently retrieved. It is also effective in a case where acquisition of information or selection of functions disposed in respectively layers is to be efficiently performed. Furthermore, it is also effective in a case where information organized and classified by linking to two-dimensional or three-dimensional positions is to be visually retrieved.

Furthermore, if a finger of a user used for pointing a portion desired to display an enlarged image has reached the end of the screen in displaying the original image, the proximity of the finger may be once reset, so as to perform an operation for displaying an enlarged image again after changing the original image by a slide operation, or alternatively, the display of a local enlarged image may be halted when the finger has reached the end of the screen, so as to restore the display to an initial state where the original image alone is displayed.

Figure 11:
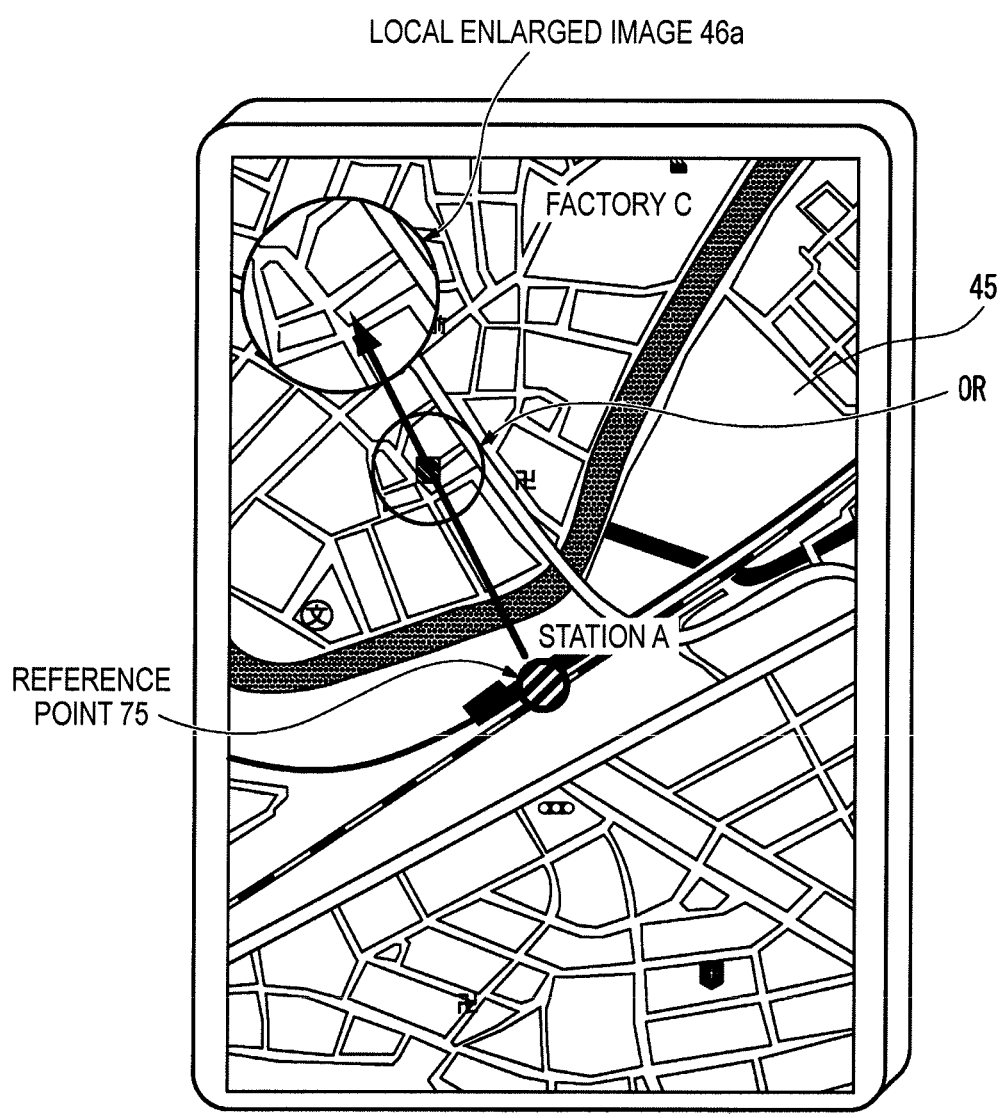
FIG. 11 is an explanatory diagram illustrating which position in an original image the detail of a local enlarged image displayed after finger movement corresponds to in performing a hover-slide operation with the finger after displaying the local enlarged image.

FIG. 11 is an explanatory diagram for describing which position in the original image the detail of a local enlarged image displayed after moving the finger 68 corresponds to when a hover-slide operation is performed with the finger 68 after displaying the local enlarged image 46a. The position of the reference point 75 in generating the enlarged image 46 (see FIG. 3) used as an original for generating the local enlarged image 46a of FIG. 11 is a position around "Station A".

In FIG. 11, it is assumed that, after displaying the local enlarged image 46a, the finger 68 is moved, due to a hover-slide operation, from the position of the reference point 75 along an arrow direction by a prescribed distance. Due to the movement of the finger 68 over the prescribed distance, the detail of the local enlarged image 46a is switched, as described in Embodiment 1, on the basis of the display magnification of the enlarged image and the relative movement of the finger 68 from the reference point 75.

The image position converting section 56 calculates, in accordance with the movement of the finger 68 from the reference point 75 in the arrow direction, which position in the original image 47 the detail of the local enlarged image 46a corresponding to the moved finger 68 corresponds to. Furthermore, the image position converting section 56 may cause the image synthesizing section 60 to display the calculated position in the original image 47, namely, the corresponding position of the local enlarged image 46a, and a prescribed range OR (see the prescribed range OR illustrated in FIG. 11) recognizably in the original image 47. In this manner, if the finger 68 is moved due to a hover-slide operation after displaying the local enlarged image 46a, the image position converting section 56 can clearly allow a user to recognize which position in the original image 47 the position of the reference point of the local enlarged image 46a displayed after the movement corresponds to. Incidentally, although the target spot 46d (see FIG. 5) is omitted in the local enlarged image 46a of FIG. 11, the target spot 46d is actually displayed in the local enlarged image 46a.

FIG. 12 is an explanatory diagram describing the details of local enlarged images obtained when the finger has gone out of the screen 45 in the lateral direction and when the finger has come back to the screen 45 in the lateral direction. In FIG. 12, the lateral direction refers to the direction of the finger 68 moving in substantially parallel to the touch panel 15 in a hover-slide operation, and is not a direction of the finger 68 moving upward in the vertical direction, namely, away from the touch panel 15.

In FIG. 12, it is assumed that the finger 68 has moved from a position around "Station A" corresponding to the reference point 75 along an arrow of the drawing (in the upper left direction of the drawing) and has gone out of the screen 45 in the lateral direction. When the finger 68 has gone out of the screen 45 in the lateral direction, the image position converting section 56 calculates, as described with reference to FIG. 11, which position in the original image 47 the detail of the local enlarged image 46a corresponds to when a part or the whole of the frame 48 displaying the detail of the local enlarged image 46a has gone out in the lateral direction. In FIG. 12, the calculated position is surrounded with a thick solid circle.

Furthermore, if the finger 68 having gone out of the screen 45 in the lateral direction in FIG. 12 has come back to the range of the screen 45 again, namely, if the proximity of the finger 68 is detected within a proximity detection range of the touch panel 15 as a result of a hover-slide operation, the image position converting section 56 displays the local enlarged image 46a, which is formed by enlarging, with the enlarged display magnification, a position in the original image 47 corresponding to the local enlarged image 46a displayed when the finger 68 has gone out of the range of the screen 45 in the lateral direction, in a position of the coordinates (x, y) vertically below the proximate coordinates (x, y, z) of the finger 68 in a superimposed manner over the original image 47.

In this manner, also in the case where the finger 68 has gone out of the range of the screen 45 in the lateral direction by mistake, or a local enlarged image in the arrow direction of FIG. 12 is desired to be displayed, the mobile terminal 1 does not regard, as an error operation, the operation in which the finger 68 has gone out of the range of the screen 45, but can allow a local enlarged image desired by a user to be continuously browsed by a continuous operation over such a wide range that the finger 68 moves beyond the screen 45.

Incidentally, this application is based upon the prior Japanese Patent Application (Japanese Patent Application No. 2012-098146) filed on Apr. 23, 2012, the entire contents of which are incorporated herein by reference.

INDUSTRIAL APPLICABILITY

The present invention is useful as a display device, a display control method, and a program in which when content is displayed, the detail of the content displayed in a screen is selectively switched in accordance with an input operation performed by a user on a touch panel without requiring a complicated operation.

DESCRIPTION OF REFERENCE SIGNS 1 mobile terminal
5 proximity detecting section
10 touch detecting section
11 processor
13 display section
14 touch panel driver 15 touch panel
16 power source control section
17 communication control section
17a antenna
21 a table
23 storage section
30 image displaying section
51 proximity coordinate extracting section
52 touch coordinate extracting section
54 display layer switch determining section
55 image button managing section
55a image operation button database
56 image position converting section
58 display layer image generating section
59 application screen generating section
60 image synthesizing section
65 application

The invention claimed is:

1. A display apparatus comprising:
a display; and a detector, wherein,
when the display displays a first screen on a first layer, and the detector detects contactless proximity of an object to the display displaying the first screen and first coordinates of the object in contactless proximity to the display displaying the first screen,
   a first area of the first screen,
      which includes the first coordinates of the object in contactless proximity to the display and has a predetermined correspondence with the first coordinates,
   is enlarged to a first enlarged area having a predetermined shape and a predetermined size, and the display displays the first enlarged area on a second layer overlapping the first screen;
while the display is displaying the first enlarged area overlapping the first screen and the detector is detecting the contactless proximity of the object to the display and the first coordinates of the object,
when the detector detects the contactless proximity of the object to the display and second coordinates of the object in contactless proximity to the display, the second coordinates being different from the first coordinates and within the first enlarged area,
   a second area of the first screen,
      which includes the second coordinates of the object in contactless proximity to the display and has the predetermined correspondence with the second coordinates,
   is enlarged to a second enlarged area having the predetermined shape and the predetermined size,
   the second enlarged area is centered at a centering coordinate, wherein a distance between the centering coordinate and the first coordinates is a result of multiplication of a ratio between a display magnification of the first layer and a display magnification of the first enlarged area on the second layer and a relative movement amount of the object from the first coordinates to the second coordinates; and
   the display displays the second enlarged area overlapping the first screen;
while the display is displaying the second enlarged area overlapping the first screen and the detector is detecting the contactless proximity of the object to the display and the second coordinates of the object,
when the detector detects a contact of the object to the display and third coordinates of the object contacting the display within the second enlarged area,
an item displayed within the second enlarged area and at the third coordinate of the object contacting the display is selected,
wherein the object in contactless proximity to the display is in a plane parallel to the display within a prescribed distance threshold value with respect to the display.

2. The display apparatus according to claim 1, wherein the second enlarged area changes a position from a position of the first enlarged area, regardless of a position of the second coordinates with respect to a boundary of the first enlarged area.

3. The display apparatus according to claim 1, wherein the object is a finger of a user.

4. The display apparatus according to claim 1, wherein the object is a stylus.

5. The display apparatus according to claim 1, wherein when the item displayed within the second enlarged area is selected, the display apparatus starts an operation.

6. The display apparatus according to claim 1, wherein a distance between the first coordinates and the first area is equal to a distance between the second coordinates and the second area, and the first area and the second area have a same shape and a same size.

7. A display control method for a display apparatus including a display and a detector,
the display control method comprising:
   displaying a first screen on a first layer on the display;
   detecting, by the detector, contactless proximity of an object to the display displaying the first screen and first coordinates of the object in contactless proximity to the display displaying the first screen;
   enlarging a first area of the first screen,
      which includes the first coordinates of the object in contactless proximity to the display and has a predetermined correspondence with the first coordinates,
   to a first enlarged area having a predetermined shape and a predetermined size,
      when the display displays the first screen and the detector detects the contactless proximity of the object to the display and the first coordinates of the object in contactless proximity to the display;
   displaying, on the display, the first enlarged area on a second layer overlapping the first screen;
   detecting, by the detector, the contactless proximity of the object to the display and second coordinates of the object in contactless proximity the display,
      while the display is displaying the first enlarged area overlapping the first screen and the detector is detecting the contactless proximity of the object and the first coordinates of the object,
      the second coordinates being different from the first coordinates and within the first enlarged area;
   enlarging a second area of the first screen,
      which includes the second coordinates of the object in contactless proximity to the display and has a predetermined correspondence with the second coordinates,
   to a second enlarged area having the predetermined shape and a predetermined size,
   the second enlarged area is centered at a centering coordinate, wherein a distance between the centering coordinate and the first coordinates is a result of multiplication of a ratio between a display magnification of the first layer and a display magnification of the first enlarged area on the second layer and a relative movement amount of the object from the first coordinates to the second coordinates, when the detector detects the contactless proximity of the object to the display displaying the first enlarged area overlapping the first screen and the second coordinates of the object in contactless proximity to the display;

displaying, on the display, the second enlarged area overlapping the first screen;

detecting, by the detector, a contact of the object to the display and third coordinates of the object contacting the display within the second enlarged area, while the display is displaying the second enlarged area overlapping the first screen and the detector is detecting the contactless proximity of the object to the display and the second coordinates of the object; and selecting an item displayed within the second enlarged area and corresponding to the third coordinates of the object contacting the display, when the detector detects the contact of the object to the display and the third coordinates of the object contacting the display within the second enlarged area, wherein the object in contactless proximity to the display is in a plane parallel to the display within a prescribed distance threshold value with respect to the display.

8. The display control method according to claim 7, wherein the second enlarged area changes a position from a position of the first enlarged area, regardless of a position of the second coordinates with respect to a boundary of the first enlarged area.

9. The display control method according to claim 7, wherein the object is a finger of a user.

10. The display control method according to claim 7, wherein the object is a stylus.

11. The display control method according to claim 7, wherein when the item displayed within the second enlarged area is selected, the display apparatus starts an operation.

12. The display control method according to claim 7, wherein a distance between the first coordinates and the first area is equal to a distance between the second coordinates and the second area, and the first area and the second area have a same shape and a same size.

13. A non-transitory computer readable recording medium storing a program, when executed by a processor provided in a display apparatus having a display and a detector, that causes the processor to perform a process comprising:

displaying a first screen on a first layer on the display;

detecting, by the detector, contactless proximity of an object to the display displaying the first screen and first coordinates of the object in contactless proximity to the display displaying the first screen;

enlarging a first area of the first screen,
which includes the first coordinates of the object in contactless proximity to the display and has a predetermined correspondence with the first coordinates, to a first enlarged area having a predetermined shape and a predetermined size, when the display displays the first screen and the detector detects the contactless proximity of the object to the display and the first coordinates of the object in contactless proximity to the display;

displaying, on the display, the first enlarged area on a second layer overlapping the first screen;

detecting, by the detector, the contactless proximity of the object to the display and second coordinates of the object in contactless proximity the display, while the display is displaying the first enlarged area overlapping the first screen and the detector is detecting the contactless proximity of the object and the first coordinates of the object, the second coordinates being different from the first coordinates and within the first enlarged area;

enlarging a second area of the first screen,
which includes the second coordinates of the object in contactless proximity to the display and has a predetermined correspondence with the second coordinates, to a second enlarged area having the predetermined shape and a predetermined size, the second enlarged area is centered at a centering coordinate, wherein a distance between the centering coordinate and the first coordinates is a result of multiplication of a ratio between a display magnification of the first layer and a display magnification of the first enlarged area on the second layer and a relative movement amount of the object from the first coordinates to the second coordinates, when the detector detects the contactless proximity of the object to the display displaying the first enlarged area overlapping the first screen and the second coordinates of the object in contactless proximity to the display;

displaying, on the display, the second enlarged area overlapping the first screen;

detecting, by the detector, a contact of the object to the display and third coordinates of the object contacting the display within the second enlarged area, while the display is displaying the second enlarged area overlapping the first screen and the detector is detecting the contactless proximity of the object to the display and the second coordinates of the object; and selecting an item displayed within the second enlarged area and corresponding to the third coordinates of the object contacting the display, when the detector detects the contact of the object to the display and the third coordinates of the object contacting the display within the second enlarged area, wherein the object in contactless proximity to the display is in a plane parallel to the display within a prescribed distance threshold value with respect to the display.

14. The non-transitory computer readable recording medium according to claim 13, wherein the second enlarged area changes a position from a position of the first enlarged area, regardless of a position of the second coordinates with respect to a boundary of the first enlarged area.

15. The non-transitory computer readable recording medium according to claim 13, wherein the object is a finger of a user.

16. The non-transitory computer readable recording medium according to claim 13, wherein the object is a stylus.

17. The non-transitory computer readable recording medium according to claim 13, wherein a distance between the first coordinates and the first area is equal to a distance between the second coordinates and the second area, and the first area and the second area have a same shape and a same size.

* * * * *